(12) United States Patent
Gölling et al.

(10) Patent No.: US 9,725,160 B2
(45) Date of Patent: Aug. 8, 2017

(54) FLOW BODY AND METHOD FOR TAKING IN AND/OR BLOWING OUT FLUID THROUGH A PLURALITY OF OPENINGS IN A FLOW SURFACE SECTION OF A FLOW BODY

(75) Inventors: Burkhard Gölling, Buchholz (DE); Erik Wassen, Berlin (DE); Tobias Hoell, Berlin (DE); Frank Thiel, Berlin (DE)

(73) Assignee: Airbus Operations GmbH, Hamburg (DE)

( * ) Notice: Subject to any disclaimer, the term of this patent is extended or adjusted under 35 U.S.C. 154(b) by 401 days.

(21) Appl. No.: 13/606,835

(22) Filed: Sep. 7, 2012

(65) Prior Publication Data
US 2013/0062473 A1    Mar. 14, 2013

Related U.S. Application Data

(60) Provisional application No. 61/532,438, filed on Sep. 8, 2011.

(30) Foreign Application Priority Data

Sep. 8, 2011 (DE) .......................... 10 2011 112 555

(51) Int. Cl.
*B64C 21/02* (2006.01)

(52) U.S. Cl.
CPC ........ *B64C 21/025* (2013.01); *B64C 2230/06* (2013.01); *Y02T 50/166* (2013.01)

(58) Field of Classification Search
CPC .............. B64C 21/025; B64C 2230/06; B64C 2230/16; B64C 2230/18; B64C 2230/22; B64C 21/08; Y02T 50/168

USPC ........... 244/200, 200.1, 204, 204.1, 207–210
See application file for complete search history.

(56) References Cited

U.S. PATENT DOCUMENTS

| | | | | |
|---|---|---|---|---|
| 2,071,744 | A | * | 2/1937 | Anathor-Henrikson ..... 244/12.1 |
| 2,585,676 | A | * | 2/1952 | Poisson-Quinton .......... 244/208 |
| 2,868,479 | A | * | 1/1959 | Kadosch et al. ............. 244/207 |
| 3,467,348 | A | * | 9/1969 | Lemelson ..................... 244/130 |
| 3,604,661 | A | * | 9/1971 | Mayer, Jr. ................. B63B 1/38 |
| | | | | 114/67 A |

(Continued)

FOREIGN PATENT DOCUMENTS

| DE | 15 06 580 | 9/1969 |
|---|---|---|
| WO | WO 03/039949 | 5/2003 |
| WO | WO 2009/004499 | 1/2009 |

OTHER PUBLICATIONS

European Examination Report for Application No. 10 2011 112 555.1 dated Jun. 30, 2014.

*Primary Examiner* — Brian M O'Hara
(74) *Attorney, Agent, or Firm* — Jenkins, Wilson, Taylor & Hunt, P.A.

(57) ABSTRACT

A flow body and method for taking in and/or blowing out fluid through a plurality of openings in a flow surface section of a flow body is disclosed. In some aspects, the flow body includes a flow surface section that extends in a flow body wingspan direction and a flow body chord direction and with a plurality of fluid lines that lead into the flow surface section and respectively form an opening therein. In some aspects, the method includes taking in and/or blowing out fluid through at least one fluid line that leads into a flow surface section of a flow body and respectively forms an opening therein.

3 Claims, 10 Drawing Sheets

(56) References Cited

U.S. PATENT DOCUMENTS

| | | | |
|---|---|---|---|
| 4,932,612 A * | 6/1990 | Blackwelder | B64C 21/025 244/130 |
| 5,687,934 A | 11/1997 | Owens | |
| 6,371,414 B1 * | 4/2002 | Truax et al. | 244/201 |
| 6,412,731 B1 * | 7/2002 | Gabriel | 244/12.1 |
| 6,629,674 B1 * | 10/2003 | Saddoughi et al. | 244/207 |
| 7,305,893 B2 * | 12/2007 | Powell | B64C 21/025 73/861.74 |
| 2007/0051855 A1 | 3/2007 | Shmilovich et al. | |
| 2010/0116943 A1 * | 5/2010 | Meister | 244/208 |

* cited by examiner

FLOW BODY AND METHOD FOR TAKING IN AND/OR BLOWING OUT FLUID THROUGH A PLURALITY OF OPENINGS IN A FLOW SURFACE SECTION OF A FLOW BODY

CROSS-REFERENCE TO RELATED APPLICATIONS

This application claims the benefit of and priority to U.S. Provisional Application No. 61/532,438, filed Sep. 8, 2011 and German Patent Application No. DE 10 2011 112 555.1, filed on Sep. 8, 2011, the entire disclosures of which are both incorporated by reference herein.

BACKGROUND

The invention pertains to a flow body with at least one opening for blowing out a fluid and a method for taking in and/or blowing out fluid through a plurality of openings in a flow surface section of a flow body.

A flow body of this type is known from US 2007/0051855 A1.

It is the objective of the invention to make available a flow body with at least one opening for blowing out a fluid and a method for taking in and/or blowing out fluid through a plurality of openings in a flow surface section of a flow body which respectively make it possible to prevent the separation of the flow on the upper side of a wing in a favorable fashion with respect to fluid dynamics.

This objective is attained with the characteristics of the independent claims. Other embodiments are defined in the dependent claims that refer to these independent claims.

Due to the inventive solutions, the separation behavior of the flow on the flow surface section is positively influenced. The design of the end sections of the discharge line or the discharge opening generates a more energetic discharge flow than in corresponding solutions according to the prior art such that the flow along the flow surface section forms a laminar flow on the flow surface over a larger region extending in the flow body chord direction.

SUMMARY

According to an aspect of the invention, a flow body with a flow surface section that extends in a flow body wingspan direction and a flow body chord direction and with a plurality of fluid lines that lead into the flow surface section and respectively form an opening therein is proposed. Such a flow body features a plurality of openings that are arranged behind one another in a row viewed in the flow body wingspan direction, wherein the maximum length of each of the openings in the flow body wingspan direction lies between 25% and 50% of the average chord length of the flow body. The average chord length of the flow body may be the average chord length of the flow body over its entire wingspan or the average chord length of a region or section extending in the flow body wingspan direction, in which the respective opening extends in the flow body wingspan direction. According to an embodiment of the inventive flow body, it would alternatively or additionally also be possible that the shortest distance resulting in the flow body wingspan direction between two respective openings that are arranged adjacently in the flow body wingspan direction lies between 25% and 50% of the average chord length of the flow body that results in the region extending in the flow body wingspan direction, over which the respective opening extends.

According to an embodiment of the inventive flow body, it is proposed that each opening of the plurality of openings is situated in a region between 3% and 12% of the average chord length of the flow body that extends in the flow body chord direction from a leading edge section of the flow body that faces the assumed flow direction, wherein the average chord length of the flow body results in the region extending in the flow body wingspan direction, over which the respective opening extends.

According to an embodiment of the inventive flow body, it is proposed that each opening of the plurality of openings has a width in the flow body chord direction that lies between 3 mm and 30 mm over at least 50% of its length in the flow body wingspan direction.

According to another embodiment of the inventive flow body, it is proposed that the openings are shaped in such a way that the greatest distance between two opposite lateral edges of the openings in the flow body wingspan direction is at least twice as large as the greatest distance between two opposite lateral edges of the openings in the flow body chord direction.

According to an aspect of the invention, a method for ingesting and/or a blowing out fluid through a plurality of fluid lines that lead into a flow surface section extending in a flow body wingspan direction and a flow body chord direction and respectively form an opening therein is proposed, wherein the plurality of openings forms at least one row of first openings and second openings that are arranged behind one another in the flow body wingspan direction, and wherein the first and the second openings are alternately arranged behind one another in the flow body wingspan direction, with said method featuring the following steps:

- taking in fluid through the first openings during a first time segment
- blowing out fluid through the second openings during at least a fraction of the first time segment,
- blowing out fluid through the first openings during a second time segment, and
- taking in the fluid through the second openings during at least a fraction of the second time segment.

In the inventive method, it would be possible, in particular, that the first time segment and the second time segment are identical and recur alternately.

According to another aspect of the invention, a flow body, preferably for an aircraft, with a flow surface section extending along a flow body wingspan direction and a flow body chord direction and with at least one fluid line that leads into the flow surface section and respectively forms an opening therein is proposed. An end section of the fluid line of the flow body that leads into the flow surface section is shaped in such a way in the plane defined by the flow body chord direction and the flow body wingspan direction that the cross section of the fluid line end section leading into the respective opening is tapered or widened along the flow body thickness direction.

According to an embodiment of the inventive flow body, it is proposed that the enlargement or reduction of the fluid line end section occurs over a section that extends in the flow body thickness direction S-D and amounts to at least 40% of the greatest cross-sectional thickness in the flow body chord direction of the opening, into which the respective end section leads.

According to another aspect of the invention, a method for taking in and/or a blowing out fluid through at least one fluid line that leads into a flow surface section of a flow body and respectively forms an oblong opening therein is proposed, wherein the end section of the fluid line leading into the flow surface section is shaped in such a way in the plane defined by the flow body chord direction and the flow body wingspan direction that the end section of the discharge line is tapered or widened in the flow body thickness direction.

According to another aspect of the invention, a high-lift body for being arranged on a trailing edge of a main wing of an aircraft with a flow surface section that extends along a flow body wingspan direction and a flow body chord direction of the high-lift body and with at least one fluid line that leads into the flow surface section and respectively forms an oblong opening therein is proposed. In this case, an and section of the fluid line leading into the flow surface section can be adjusted in such a way that the direction of the end section of the fluid line leading into the flow surface section can be varied relative to the flow body chord direction of the high-lift body within a predefined adjusting range. It would additionally or alternatively also be possible to couple the end section of the fluid line to an adjusting device in such a way that the adjusting device can adjust the direction of the end section of the fluid line within the predefined adjusting range.

According to an embodiment of the inventive high-lift body, it is proposed that an angle occurring between the direction of the center line of the fluid line end section situated at the oblong opening and the local surface chord direction lies between 0 degrees and 40 degrees and/or that the adjusting range is realized in such a way that an angle occurring between the direction of the center line of the fluid line end section situated at the oblong opening and the local surface chord direction lies between 170 degrees and 90 degrees.

According to another aspect of the invention, a method for taking in and/or blowing out fluid through at least one fluid line that leads into a flow surface section of a flow body and respectively forms an opening therein is proposed. In this method, it is proposed that an end section of the fluid line leading into the flow surface section is adjusted by means of an adjusting device coupled to the fluid line end section in such a way that the direction of the end section of the fluid line leading into the flow surface section is varied relative to the flow body chord direction within a predefined adjusting range.

In an inventive embodiment of the method for taking in and/or blowing out fluid on a flow body, it is proposed that the flow body comprises of a high-lift body that is arranged on the trailing edge of a main wing of an aircraft, and that the adjusting device for the fluid line end section is functionally coupled to a control device for controlling the adjusting position of the high-lift body in such a way that the adjusting device for the fluid line end section carries out an adjustment of the high-lift body in dependence on a commanded and/or acquired adjusting position of the high-lift body received from the control device.

In the inventive method, the adjustment of the high-lift body by means of the adjusting device for the fluid line end section may be carried out in such a way that, based on the adjusting position of the high-lift body and a current angle of attack, the discharge angle is adjusted between ±15 degrees relative to the chord direction of the main wing or ±15 degrees relative to the flow direction of the fluid flowing against the main wing.

According to another aspect of the invention, a flow body for being arranged on a trailing edge of a main wing of an aircraft is proposed, wherein said flow body features a flow surface section that extends along a flow body wingspan direction and a flow body chord direction and at least one fluid line that leads into the flow surface section and respectively forms an opening therein, wherein the opening is shaped in such a way that the local length of the opening in the wingspan direction increases or decreases over at least a region of 40% of the maximum width in the flow body chord direction.

According to an embodiment of the inventive flow body, it is proposed that the wall of an end section of the fluid line leading into the flow surface section is tapered or widened in the plane defined by a local flow body chord direction and a local flow body wingspan direction.

According to another aspect of the invention, a method for taking in and/or blowing out fluid through at least one fluid line that leads into a flow surface section of a flow body and respectively forms an opening therein is proposed, wherein the opening is shaped in such a way that the local length of the opening in the wingspan direction increases or decreases over at least a region of 40% of the maximum width in the flow body chord direction.

BRIEF DESCRIPTION OF THE DRAWINGS

Exemplary embodiments of the invention are described below with reference to the attached figures, in which.

DETAILED DESCRIPTION

Figure 1:
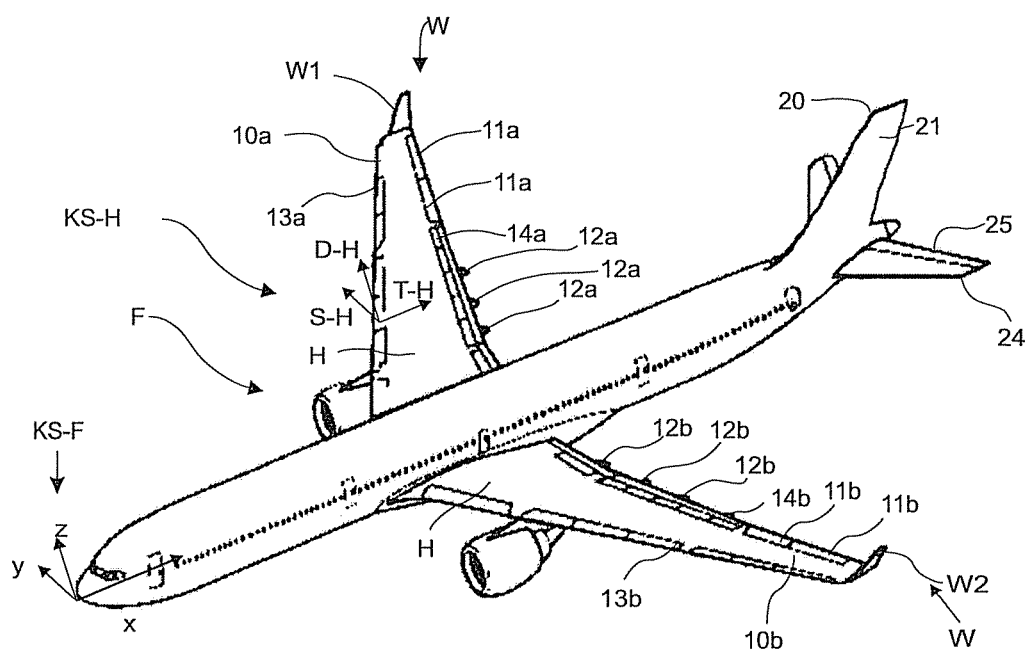
FIG. 1 shows a perspective representation of an aircraft with flow bodies and, in particular, an airfoil, regulating flaps and high-lift bodies, on which the invention can be utilized.

The invention generally refers to a flow body K, i.e., a fluid-dynamic body, against and around which a flow occurs during its intended use. In order to influence the flow occurring against the flow body K and at least partially around the flow body along a flow surface section S, the flow body K features at least one flow channel or flow channel end section 50 that forms a flow surface opening 51 or an oblong opening in a flow surface section S of the flow body S. The fluid line 50 or the flow channel end section 53 may have the function of a discharge line and an intake line, as well as of an intake and discharge line. In the embodiments of the invention, the flow body may feature an integrated flow booster drive 70 that is preferably connected to a junction conduit 45 that connects at least two openings on the upper flow surface to one another, wherein the line end piece or the line end section 53 leads into the flow surface and forms one of the openings therein. The junction conduit 45 may connect the line end section 53 to at least one other line end section that leads, in particular, into the flow surface section S. The fluid line 50 may be fluidically connected to an intake opening 40, in particular, by means of a flow conduit 45.

According to the invention, the fluid line is provided for discharging or blowing out fluid made available via the discharge line 50 on the flow surface S and/or for taking in fluid present above the flow surface S due to the flow against the flow body. In this case, the discharge and the intake may be respectively realized such that a pulsed or non-pulsed discharge or blow-out and, if applicable, intake is realized through the flow channel or discharge opening 51. The fluid line or flow channel 50 may be referred to as a discharge and intake line if a pulsed and alternating discharge and intake takes place at the opening 51. According to an embodiment of the invention, it is proposed that a flow booster drive or fluid actuator is coupled to the discharge line 50 or a flow booster drive or fluid actuator is integrated into the discharge line 50, wherein said flow booster drive or fluid actuator influences the discharge and the intake of fluid through the discharge line 50 and therefore actuates the discharge and the intake through the discharge opening 51 periodically and, in particular, alternately between several fluid lines. The discharge of the fluid on the flow surface of the flow body K or the fluid-dynamic body creates a region of the flow surface section S that is influenced by the fluid and, with respect to the flow body or fluid-dynamic body K, essentially situated behind the opening referred to the flow direction S. i.e., the flow is influenced by the fluid being discharged after it passes over the discharge opening 51. This results in a certain proportion between a rear influenced region and a front region that is not influenced by the discharge of the fluid. The flow in this rear region can be purposefully adjusted by means of the inventive solutions such that it is possible, in particular, to reduce the separation tendency of the flow or the separation of the flow under flow conditions that cause such a separation of the flow from the flow surface in the rear region, e.g., at a certain flow against the flow body or fluid-dynamic body K.

According to an inventive embodiment, air flows against the flow body or fluid-dynamic body K during its intended use such that it is actually an aerodynamic body. In this case, the aerodynamic body may form a component of a vehicle and, in particular, an aircraft or a land craft such as, e.g., an automobile or a watercraft or ship. The aerodynamic body or the aerodynamic component of an automobile may comprise, in particular, a spoiler.

FIG. 1 shows an aircraft F with two airfoils 20a, 20b, on which embodiments of the invention can be utilized. A coordinate system KS-F referred to the aircraft F with a longitudinal aircraft axis X, a lateral aircraft axis Y and a vertically aircraft axis Z is illustrated in FIG. 1. The airfoils 10a, 10b, on which the invention is utilized, respectively feature a main wing H and at least one aileron 11a and 11b that is arranged on the main wing such that it can be moved in two moving directions, optionally at least one spoiler 12a and 12b that is movably arranged on the main wing, optionally at least one leading edge high-lift body 13a, 13b such as, e.g., a slat or a leading edge flap that is arranged on the main wing such that it can be moved between a retracted and extended position, and optionally at least one trailing edge flap 14a, 14b.

In order to simplify the illustration, only a few and not all of the respective spoilers 12a and 12b, slats or leading edge flaps 13a, 13b and/or trailing edge flaps 14a, 14b illustrated in FIG. 1 are identified by reference symbols.

Figure 2:
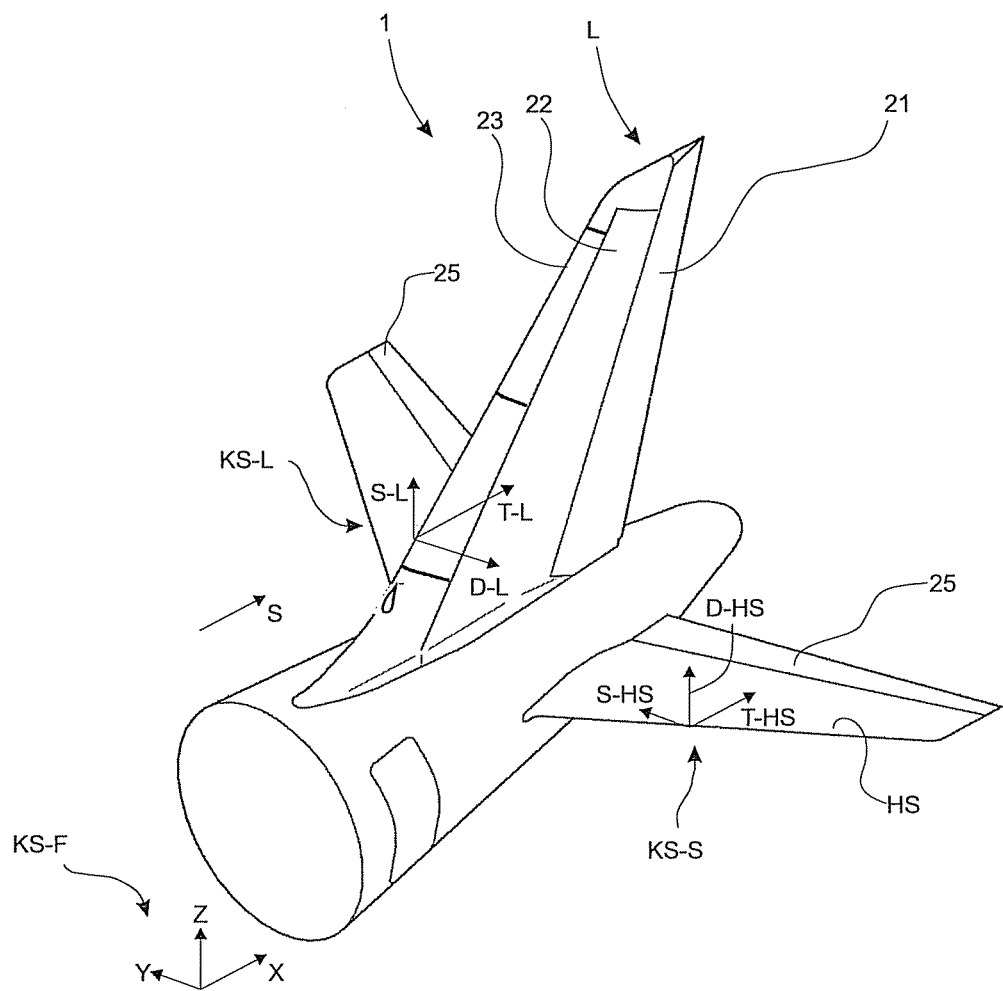
FIG. 2 shows a perspective representation of a tail unit of an aircraft with flow surfaces, on which the invention can be utilized.

Furthermore, the aircraft F illustrated in FIG. 1 features a rudder unit 20 with at least one rudder 21. The aircraft F may optionally also feature an elevator unit 24 with at least one respective elevator 25 as illustrated in FIG. 2. The elevator unit 24 may also be realized in the form of a T-shaped tail unit or cruciform tail unit. The invention can also be utilized on the rudder unit 20 and/or the elevator unit 24.

The inventive aircraft F, on which the invention is utilized, may also have a different shape than the aircraft F illustrated in FIG. 1 such that the invention can also be utilized on airframes, i.e., airfoils and/or tail units, that are realized in a different fashion than those of the aircraft illustrated in FIG. 1 such as, for example, on airfoils, auxiliary wings, canards or tail units of a high-wing monoplane or a flying wing.

The inventive flow body or fluid-dynamic body K or the inventive flow body component may comprise one of the aforementioned airframe components of an aircraft, i.e., of a high-lift body or a leading edge flap 13a, 13b and/or a trailing edge flap 14a, 14b and/or a regulating flap, i.e., an aileron 11a, 11b or a spoiler 12a, 12b, and/or a rudder unit 20 and/or a rudder 21 and/or an elevator unit 24 and/or an elevator 25.

Accordingly, the following coordinate systems are implemented in order to describe the invention:

the coordinate system KS-H of the main wing H in the form of a local coordinate system with a main wing wingspan direction S-H, a main wing chord direction T-H and a main wing thickness direction D-H, wherein the origin of the local coordinate system KS-H of the main wing H is situated at the respective location of the leading edge to be selected, i.e., on the foremost line of the main wing H viewed opposite to the X-axis, and wherein the coordinate system KS-H of the main wing H is oriented in such a way that the main wing wingspan direction S-H extends in the direction of the lateral aircraft axis Y and the main wing thickness direction D-H extends in the direction of the vertical aircraft axis Z, the coordinate system KS-L of the rudder unit L in the form of a local coordinate system with a rudder unit wingspan direction S-L, a rudder unit chord direction S-L and a rudder unit thickness direction D-L of the respective rudder unit L, wherein the origin of the local coordinate system KS-L of the rudder unit L is situated at the respective location of the leading edge to be selected, i.e., on the foremost line of the rudder unit L viewed opposite to the X-axis, and wherein the coordinate system KS-H of the rudder unit L is oriented in such a way that the rudder unit wingspan direction S-H extends in the direction of the vertical aircraft axis Z and the rudder unit thickness direction D-L extends in the direction of the lateral aircraft axis Y, the coordinate system KS-HS of the elevator unit HS in the form of a local coordinate system with an elevator unit wingspan direction S-HS, an elevator unit chord direction T-HS and an elevator unit thickness direction D-HS of the respective elevator unit HS, wherein the origin of the local coordinate system KS-HS of the elevator unit HS is situated at the respective location of the leading edge to be selected, i.e., on the foremost line of the elevator unit HS viewed opposite to the X-axis, and wherein the coordinate system KS-H of the main wing H is oriented in such a way that the main wing wingspan direction S-H extends in the direction of the lateral aircraft axis Y and the main wing thickness direction D-H extends in the direction of the vertical aircraft axis Z, and generally the coordinate system KS-B of the general flow body K in the form of a local coordinate system with a flow body wingspan direction S-B, a flow body chord direction T-B and a flow body thickness direction D-K of the respective flow body B, wherein the origin of the local coordinate system KS-B of the flow body B is situated on the leading edge VK that is directed against the flow, i.e., the foremost line of the flow body K viewed opposite to the X-axis, and wherein the coordinate system KS-B of the flow body K is oriented in such a way that the flow body wingspan direction S-K extends in the direction of the lateral aircraft axis Y and the flow body thickness direction D-K extends in the direction of the vertical aircraft axis Z.

The axes X, Y, Z may also be used analogously when the invention is utilized on other vehicles such that, e.g., the X-axis is the longitudinal axis of the respective vehicle.

In the embodiments of the flow body B, e.g., in the form of a main wing, regulating flap or rudder unit, the aspects and definitions of geometric quantities such as, in particular, their wingspan direction, chord direction and thickness direction can be analogously transferred from the corresponding definitions of the flow body.

With respect to the definition of concepts and references in the description of the invention and, in particular, the flow body K, we refer to a profile cross section reference line RP, as well as to a Cartesian flow body coordinate system KS-B with a flow body wingspan direction S-B, a flow body thickness direction D-B and a flow body chord direction T-B. In this case, the wingspan direction generally extends transverse and perpendicular or about perpendicular to the cross-sectional profile areas of the flow body, i.e., the surfaces of the profile contour of the cross-sectional profile area extending along the assumed flow direction. In this case, the flow direction or inflow direction of the fluid is the direction, in which the flow body with its given shape produces its intended fluid-dynamic effect such as, e.g., a desired lift/drag ratio. The flow body wingspan direction results in a wingspan length of the flow body, i.e., the length resulting between the viewed in the reference line R. In this case, the profile cross section reference line RP may be defined, in particular, by the connecting line of the centroids of cross-sectional reference profile areas of the flow body B. The plane cross-sectional reference profile areas, the surfaces of which extend along or essentially in the intended inflow direction of the fluid and the orientation of which results from the alignment of the respective cross-sectional reference profile areas, at which the respective cross-sectional reference profile area has the smallest cross-sectional area, are respectively considered in this case. The profile cross section reference line RP may be a curved line, in particular, if the flow body B is twisted in the longitudinal direction. In this case, the wingspan direction of the flow body coordinate system KS-B may be defined, in particular, by the straight connection between the two outer end points of the profile cross section reference line RP. In an embodiment of the inventive flow body B, in which the flow body is arranged on a vehicle with one of its ends in the wingspan direction such as, in particular, on an aircraft fuselage in the form of a wing or wing part, the end arranged on the vehicle is referred to as the first end or inner end of the flow body B. This first and of the flow body B lies at the location, at which the cross-sectional reference profile area with the smallest cross-sectional area of the flow body B contacts or is sectionally identical to the intersecting area resulting from the connection of the flow body B to the vehicle part. In an alternative embodiment of the inventive flow body B, in which this flow body is not arranged on a vehicle part with one of its ends—as it is the case, e.g., with a car spoiler—and in which the flow body B has two exposed ends, the connecting line between the two outermost ends of the flow body B in the wingspan direction may be considered as the profile cross section reference line RP. In an alternative embodiment of the inventive flow body B, the resulting profile cross section reference line RP of this flow body B could be reduced by 10% of its overall length on both and the wingspan direction could then be defined as the direction and axis that connects the centroids of the respective cross-sectional reference profile areas that have the smallest cross-sectional area on both ends.

The chord direction of a general local flow body coordinate system KS-B may be defined in such a way that, based on the respectively applicable above-described definition of the flow body wingspan direction S-B, it extends in the direction of the longest chord of the cross-sectional reference profile area with the smallest cross-sectional area at all locations. The thickness direction then results as the third direction of a Cartesian coordinate system KS-B.

In an embodiment of the inventive flow body B, in which the flow body K is arranged on a vehicle with one of its ends in the wingspan direction such as, in particular, on an aircraft fuselage in the form of a wing or wing part, the chord direction T-B for a fixed flow body coordinate system KS-B may be defined in such a way that the chord direction T-B extends in the direction of the longest chord of the cross-sectional reference profile area with the smallest cross-sectional area that is situated on the first end of the flow body K.

The thickness direction then results as the third direction of a Cartesian coordinate system KS-B. According to an alternative definition of the chord direction T-B for a fixed flow body coordinate system KS-B, this chord direction may be defined in such a way that it extends in the direction of the cross-sectional reference profile area with the smallest cross-sectional area of the flow body K which has the largest surface of these cross-sectional reference profile areas of the flow body K.

If not stated otherwise in the description, the definition of geometric variables should be interpreted in such a way that, if respectively applicable alternative definitions of such variables are provided, the decisive definition is the definition, for which the largest region results.

In this case, the term "top" should, based on the airfoil T, be interpreted as the direction that extends away from the upper side S-T of the airfoil T. i.e., from the intended suction side, or in the positive Z-direction of the aircraft coordinate system KS-F or the positive wing thickness direction of the airfoil coordinate system KS-T. With respect to a main wing of an aircraft, the upper side is situated on the suction side of the flow body in its installed state and extends opposite to the direction of the gravitational force during a normal flight attitude of the aircraft or when the aircraft is on the ground. The directional designation "top" also needs to be analogously defined for other vehicles, to which the invention can be applied.

For the description of the invention, coordinate systems with respect to the flow surface section S of the flow body K and at least one region of the flow body K, around which a flow occurs as intended, are defined. Based on an assumed and intended ideal flow against the flow body K in a flow direction SR, a local flow surface coordinate system KS-S therefore is defined by a local flow surface chord direction X-S, a local flow surface wingspan direction Y-S and a local flow surface normal direction Z-S that respectively extend orthogonal to one another. The local flow surface chord direction T-S has the direction of the fluid that ideally flows against the flow body K and therefore the direction of the longitudinal vehicle or aircraft axis X if the utilization of the flow body and the flow against the flow body are as intended and, in particular, the flow body is installed into the respective vehicle as intended such that a flow surface section S is formed.

Figure 5:
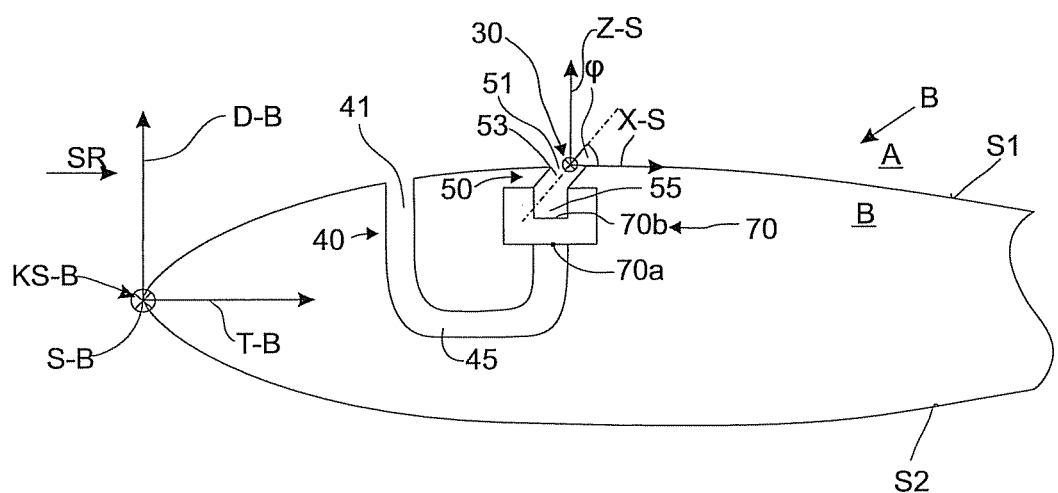
FIG. 5 shows a schematic illustration of a cross section through a flow body according to the invention, in which a flow booster drive is connected to a junction conduit that connects two openings on the upper flow surface to one another, wherein the line end section leading to one of the openings on the flow surface discharges rearward referred to the flow body chord direction.

According to the invention, the flow body features a profile plate section or profile shell section. In this case, the profile plate section or profile shell section forms, in particular, part of the outer wall of the respective flow body or flow body component of the respective vehicle according to the invention. In the schematic illustrations in the figures and, in particular, in the illustrations according to FIGS. 5 and 6, the profile plate or profile shell sections of the respective flow body component, as well as the structural components that support these sections such as, e.g., supporting beams or ribs of the flow body component, are not illustrated. The illustrated profile lines of cross sections of the flow body component schematically identify the outer contours of the respective profile plate section or profile shell section.

The chord direction of the local flow body coordinate system of the respective flow body component K extends along the longitudinal axis or the ideal or nominal inflow direction or the X-axis of the respective watercraft or aircraft. The wingspan direction or lateral direction extends in the direction of the vertical axis of the vehicle.

With respect to the profile plate section provided in accordance with the invention, this profile plate section has an outer side or flow side A, on which the fluid flows during the operation, i.e., during the intended use of the flow body K, as well as an inner side B that lies opposite to the flow side A and faces the interior of the flow body component. The flow body therefore features the flow surface section S on its outer side or flow side A.

With respect to its intended use as a flow body, the main wing H has an upper side that extends on the suction side thereof and an underside that extends on the pressure side thereof, wherein the main wing may also have a rear surface on the trailing edge of the main wing and, if applicable, a surface that faces the high-lift flap K. Based on the definition of the upper side and the underside of the main wing, the term upper side or underside is also assigned to the sides or surfaces of the tail unit components, namely depending on whether their surface faces the suction side or the pressure side of the main wing after the intended installation into the vehicle or a substructure thereof. Alternatively, the respective upper side and underside may also be defined in such away that the surface normals of the underside extend in the direction of the gravitational force when the vehicle is parked on the ground as intended.

These aspects or characteristics of a flow body can be analogously applied to aircraft and watercraft. With respect to the latter, the intended orientation of the watercraft on the water is decisive. To avoid ambiguity, the upper side or underside of regulating flaps or movable flow body components needs to be defined with respect to the neutral position or normal position thereof.

The invention is described below with reference to a high-lift flap HAK. According to the invention, the proposed characteristics of a regulating flap or a high-lift flap can be generally applied to a fluid-dynamic body, to which the characteristics described with reference to a high-lift flap can be directly or analogously transferred. On an aircraft, the fluid-dynamic body may comprise a wing, particularly a main wing, a slat or a leading edge flap, a rudder unit or a rudder or a stabilizer or an elevator. The regulating flap may be coupled to the main wing by means of a joint arrangement. The joint arrangement may feature, in particular, Dropped-Hinge Kinematics or Track Kinematics.

According to the invention, at least one oblong opening 51 is generally provided in a flow surface section S of an upper side or an underside of the flow body K. According to the invention, a discharge line 50 leads into a flow surface section S such that an oblong opening S is formed. The boundary lines and therefore the size or the shape and/or the dimensions of the respective oblong opening are defined by the extent of the edge thereof. In an instance, in which the transition between a discharge opening and the flow surface section S is sectionally realized by means of an edge line at the respective discharge opening, the extent of the edge results from such an edge line. In another instance, in which the transition between a discharge opening and the flow surface section S is sectionally realized in the form of a curved transition contour line or transition surface at the respective discharge opening, the extent of the edge of an oblong opening or discharge opening results from a deviation of the extent of the contour line in the flow surface section S that encloses and extends around the region of the opening. The extent of the edge line of the opening in the region of such a curved transition contour line or transition surface results at the location, at which a contour line of the flow body K that sectionally extends through the oblong opening and, in particular, in the flow body wingspan direction S-K or in the flow body chord direction T-K deviates from the contour line of an idealized flow body K. i.e., a flow body that is not provided with an oblong opening, in the flow body thickness direction D-S at this location. In this case, the dimensions of an oblong opening result, in particular, from at least sectionally defined edge line sections that lie opposite of one another in the flow body wingspan direction S-K or in the flow body chord direction T-K and result in the described fashion from contour lines that extend in the flow body wingspan direction S-K or in the flow body chord direction T-K and respectively adjacent to one another.

Figure 13:
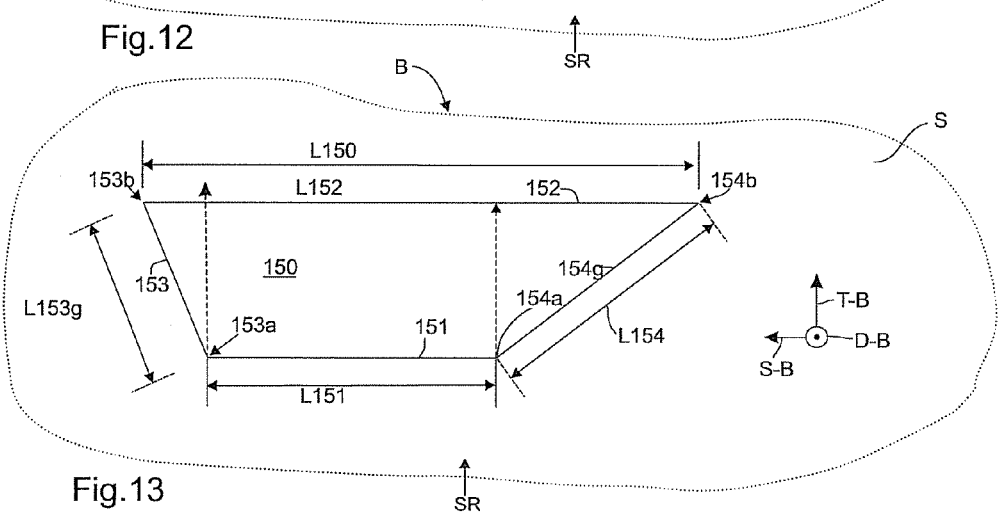
FIG. 13 shows a top view of a flow surface section according to FIG. 9 with an opening that is formed in accordance with another inventive embodiment.
Figure 14:
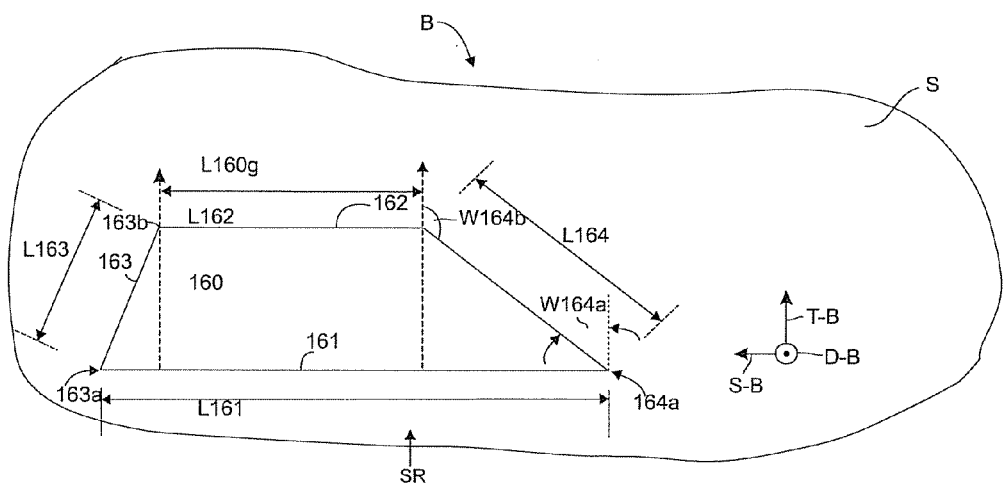
FIG. 14 shows a top view of a flow surface section according to FIG. 9 with an opening that is formed in accordance with another inventive embodiment.
Figure 15:
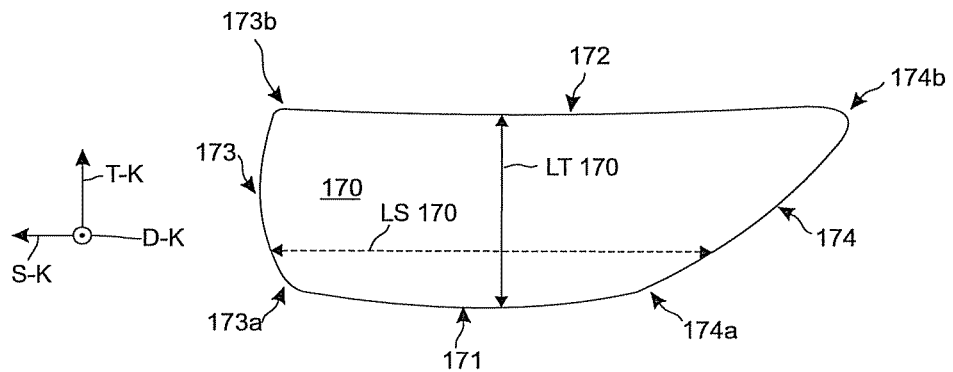
FIG. 15 shows a top view of a flow surface section according to FIG. 9 with an opening that is formed in accordance with another inventive embodiment.
Figure 16:
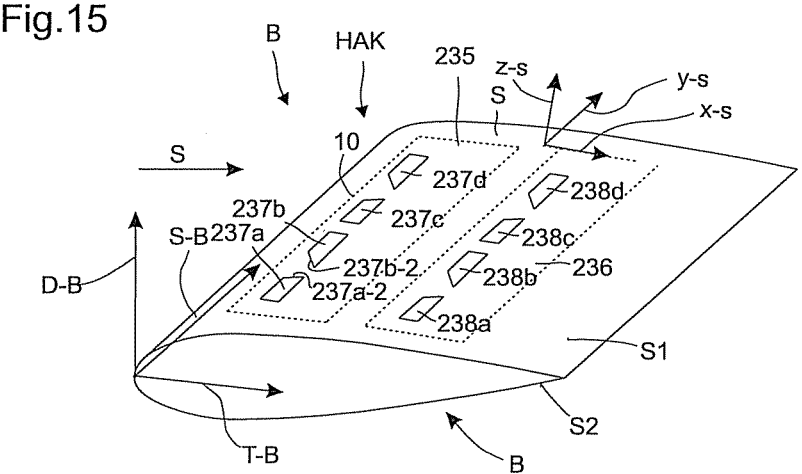
FIG. 16 shows a perspective representation of a flow body that according to another aspect of the invention, is realized with two rows of openings that are respectively arranged behind one another in the flow body wingspan direction, wherein the openings are formed in accordance with FIG. 9.

FIGS. 9 to 15 show different shapes of openings according to the invention. Possible arrangements of several oblong openings are illustrated in FIGS. 15 and 16.

Figure 3:
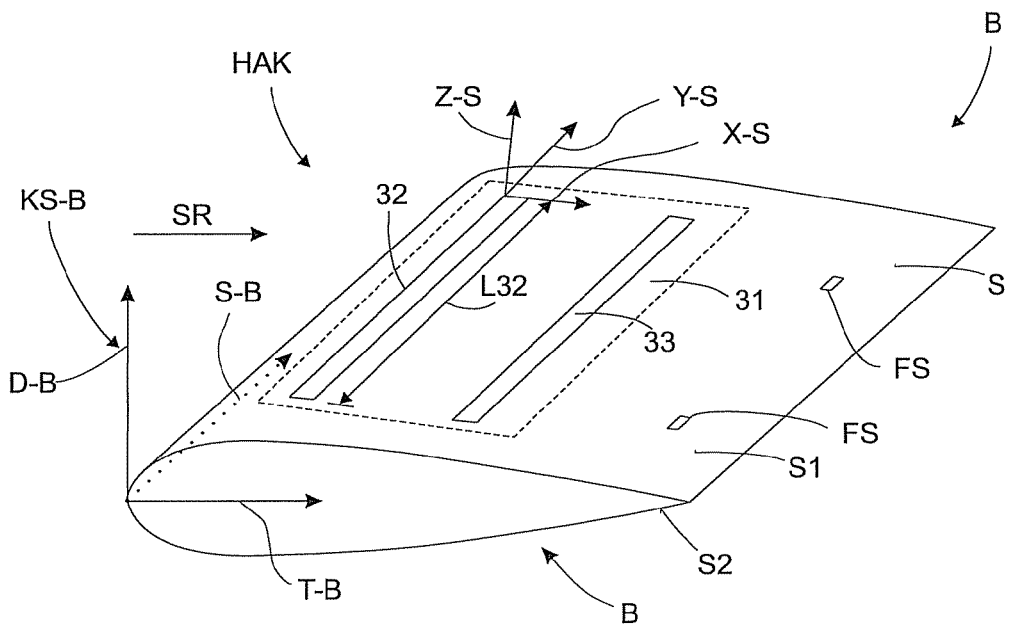
FIG. 3 shows a perspective representation of a flow body that, according to an aspect of the invention, is realized with two openings.
Figure 4:
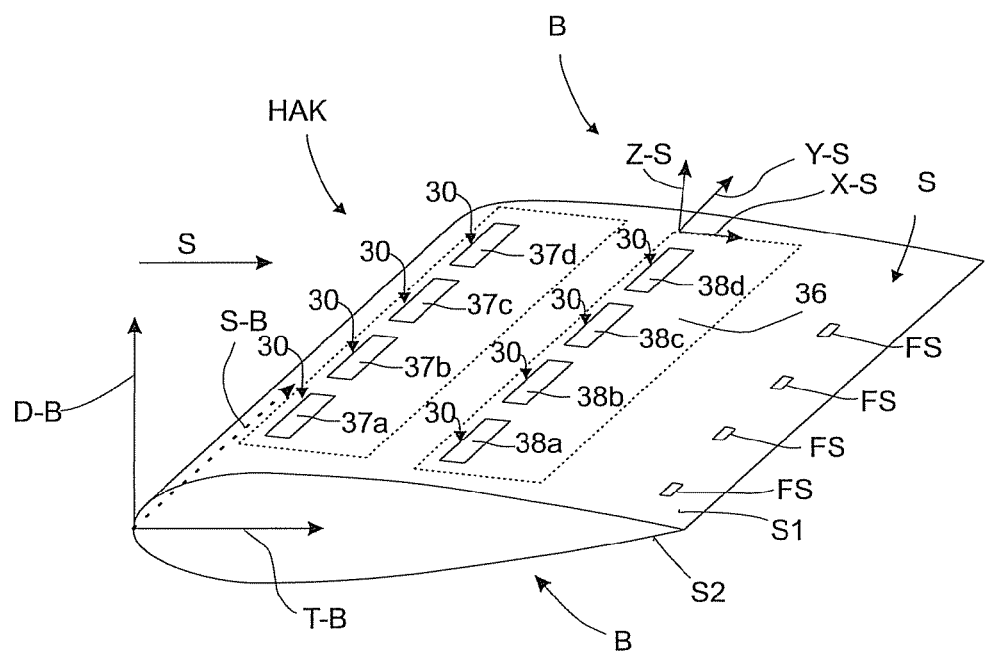
FIG. 4 shows a perspective representation of a flow body that, according to another aspect of the invention, is realized with two rows of several oblong openings that are respectively arranged behind one another in the flow body wingspan direction.

FIGS. 3 and 4 schematically show embodiments of the inventive flow body B in the form of high-lift flaps HAK, wherein different arrangements of fluid line openings are provided in a respective flow surface section S. The high-lift flap HAK illustrated in FIG. 3 features an arrangement 31 of two oblong openings 32, 33 that are arranged on the flow body K behind one another in the local surface chord direction X-S or flow body chord direction T-B, wherein the lengths of said openings respectively extend over more than 50% of the wingspan SW of the flow body K in the flow body wingspan direction S-B or the local surface wingspan direction Y-S. In this case, the front opening viewed opposite to the chord direction T-B or the opening 32 that is situated closer to the leading edge of the flow body is situated in a region between 3% and 12% of the average chord length referred to the flow body chord direction T-K in accordance with a general embodiment of the invention. According to another general embodiment of the inventive flow body B, it is proposed that at least one oblong opening or a row of such openings is situated in a region between 3% and 12% of the average chord length referred to the flow body chord direction T-B. The openings 32, 33 are furthermore realized in accordance with another general aspect of the invention, according to which the line of the maximum width or length of the oblong opening 32 extends in the region of the oblong opening 31 of the flow body or fluid-dynamic body K with a maximum deviation of 15 degrees in a wingspan direction S-K. For example, the maximum length L32 of the oblong opening 32 is illustrated in FIG. 3. With respect to the openings provided in accordance with the invention—as illustrated on the openings 32, 33—it is proposed, according to an embodiment of the invention, that the longest cross-sectional line between two points of opposite lateral edges of the opening along the flow body wingspan direction S-B is longer than the longest cross-sectional line between two points of two opposite lateral edges of the opening along the flow body chord direction T-B. According to another embodiment of the invention, the openings have a length in the flow body wingspan direction S-B that is at least twice as long as their width, particularly if these openings are arranged in a row extending in the flow body wingspan direction S-B. In the flow surface section S on the upper side S1 of the flow body B, at least one flow condition sensor is arranged in order to determine the flow condition on the surface S1, wherein two such flow condition sensors FS are provided in the embodiment according to FIG. 3. Referred to the chord direction S-B, these flow condition sensors are arranged in the rear third and, in particular, in the rear quarter of the upper side S1 of the flow body B. According to the invention, it would generally be possible to arrange at least one flow sensor FS or a row of flow sensors FS that are situated behind one another in the flow body wingspan direction S-B and respectively serve for determining the flow condition on the surface S1 in the rear third and, in particular, in the rear quarter of the flow body B on the side, on which the openings are situated, i.e., on the upper side S1 or the underside S2 of the flow body B. A flow sensor FS or a row of flow sensors FS that are situated behind one another in the flow body wingspan direction S-B may alternatively or additionally be arranged on the surface S1 between two respective openings 32, 33 that are situated behind one another in the flow body chord direction T-B.

FIG. 4 shows a high-lift flap HAK with two arrangements or rows 35, 36 of respectively four fluid lines that are situated behind one another in the local surface chord direction X-S or the flow body chord direction T-B, wherein said fluid lines respectively form oblong openings 37a, 37b, 37c, 37d and 38a, 38b, 38c, 38d in the flow surface section S and are arranged adjacent to one another in the local surface wingspan direction Y-S or the flow body chord direction T-B. According to another embodiment of the invention, the flow body B may also be provided with only one row of several discharge openings that extends in the flow body wingspan direction S-B, i.e., only the now 35 or 36 is provided on the upper side or the underside of the flow body B. The one now of openings or a first row 35 of openings is preferably arranged in a region between 3% and 12% of the average chord length in the flow body chord direction T-B.

According to the invention, it would generally be possible to arrange at least one flow sensor FS or a row of flow sensors FS that are situated behind one another in the flow body wingspan direction S-B and respectively serve for determining the flow condition on the surface S1 in the rear third and, in particular, in the rear quarter of the flow body B on the side, on which the openings are positioned, i.e., on the upper side S1 or the underside S2 of the flow body B, namely as illustrated in the embodiment according to FIG. 4. In this case, it would be possible to arrange one flow sensor FS or a plurality of flow sensors FS behind the rearmost row of openings viewed in the flow body chord direction T-B. One flow sensor FS or a row of flow sensors FS that are situated behind one another in the flow body wingspan direction S-B may be alternatively or additionally arranged on the surface S1 between two respective openings 32, 33 that are situated behind one another in the flow body chord direction T-B.

FIGS. 9 to 15 show possible shapes of the openings illustrated in FIGS. 3 and 4.

Due to such a segmentation, a laminar stimulation of the fluid flowing over the surface S1 and therefore also its energization is achieved when fluid is discharged through the respective openings of the surface G1. The openings produced in accordance with the invention and the fluid being discharged over a majority of the wingspan of the flow body K stabilizes the flow over the surface S1, S2, namely even if the angle of attack of the flow body K is significantly increased with respect to the fluid flowing against the flow body B. On a high-lift body HAK that is arranged on the trailing edge of a main wing, the inventive effect occurs, in particular, in an adjusting range of the high-lift body between 4 degrees and 90 degrees, wherein these dimension figures may be defined, in particular, as the angle between the main wing chord and the chord of the high-lift body. This inventive intake and/or discharge of fluid alternatively or additionally makes it possible to increase the lift of the inventive flow body K by taking in and/or blowing out fluid through the openings provided in accordance with the invention.

According to an embodiment of the invention, at least one row of segment openings 37a, 37b, 37c, 37d or 38a, 38b, 38c, 38d that are situated behind one another in the flow body wingspan direction S-K is provided in a flow surface section S of an upper side or an underside of the flow body B. At a given and, in particular, average chord length of the flow body B, the average length of each oblong opening in the flow body wingspan direction S-K lies between 25% and 50% of the average chord length of the flow body B. In this context, the term average length of the openings refers to the average length of the respective opening that results along the chord direction of the flow body. In this case, it would be possible, in particular, that the distance between the openings, i.e., the distance between the points of two adjacent oblong openings that are respectively situated closest to one another, lies between 25% and 50% of the average chord length of the flow body B. The distance between the oblong openings may, in particular, lie between 28% and 38% of the average chord length of the flow body B.

In this case, the segment openings may be situated, in particular, in a region between 3% and 10% of the average flow body chord length behind the leading edge of the flow body B.

The shape of the oblong openings formed in a flow surface section S may be defined in different ways as elucidated below with reference to FIGS. 9 to 15 and with reference to FIGS. 18 to 23, in which the shape of the end sections of the fluid lines is also illustrated.

For example, the oblong openings may have a rectangular shape. In this case, it would be possible, in particular, to replace at least one of the corners of the oblong opening with a rounded edge section.

In these embodiments of the flow body K, the oblong openings 37a, 37b, 37c, 37d and 38a, 38b, 38c, 38d may be realized in such a way that the respective oblong opening is sectionally tapered in the flow body chord direction T-B, particularly due to the design of the lateral edges that extend between the longitudinal edges. The oblong openings may be realized, in particular, in accordance with an embodiment described herein.

On an inventive flow body B with at least one row of oblong openings 37a, 37b, 37c, 37d; 38a, 38b, 38c, 38d that are situated behind one another in the flow body wingspan direction S-B, mixing of the fluid that flows along the respective flow surface section S with the fluid being discharged through the oblong openings is achieved. It was surprisingly determined that, due to the inventive size range of the segments and, in particular, the average segment length of the oblong openings in the flow body wingspan direction S-B of each of the oblong openings in dependence on the average chord length of the flow body B, it is particularly advantageous to take in or blow out fluid in a pulsed fashion and with a constant throughput over an operating period. In this case, the fluid flowing along the respective flow surface section S is mixed with the fluid being discharged through the oblong openings to a predetermined degree such that the fluid flowing on the respective flow surface section S is energized in accordance with the size and, in particular, the chord length of the flow body and subjected to vortexing due to the mixing process such that the lift characteristics and, in particular, the coefficient of lift of the flow body are improved at a given angle of attack thereof relative to the flow.

Such a row of oblong openings generates, in particular, longitudinal vortexes with an intensity that corresponds to the chord length in the fluid flowing on the respective flow surface section S, wherein these longitudinal vortexes stabilize the flow condition at this location and along the further extent of the flow. This applies, in particular, to larger angles of attack of the flow body K.

This effect can be intensified, in particular, by discharging fluid through respectively adjacent oblong openings in a time-delayed fashion. At two respectively adjacent oblong openings, fluid preferably is alternately blown out through a first oblong opening and taken in through the respectively second oblong opening and vice versa. In this case, it would be possible, in particular, to alternately take in and blow out fluid in one respective time segment through two respective oblong openings 37a, 37b, 37c, 37d; 38a, 38b, 38c, 38d of the now of oblong openings 37a, 37b, 37c, 37d; 38a, 38b, 38c, 38d that are situated adjacent to one another in the flow body wingspan direction S-B, wherein fluid is in each time segment simultaneously taken in through a respective first oblong opening 37a, 37b, 37c, 37d; 38a, 38b, 38c, 38d and discharged through a second oblong opening 37a, 37b, 37c, 37d; 38a, 38b, 38c, 38d—e.g., through the openings 37a and 37b—of the respectively adjacent oblong openings 37a, 37b, 37c, 37d; 38a, 38b, 38c, 38d and vice versa.

In a row that comprises four and, in particular, more than two oblong openings, it would be possible that a respective first oblong opening alternates with a respective second oblong opening in the wingspan direction. In this case, the discharge and intake of fluid through respectively adjacent oblong openings of a row of oblong openings 37a, 37b, 37c; 38a, 38b, 38c that are situated behind one another in the flow body wingspan direction S-B alternates between intake and discharge through the same respective oblong opening and takes place in phase opposition referred to the respectively adjacent oblong openings. The intake and discharge of fluid may take place, in particular, in accordance with a sine function, wherein the value of the function describes, in particular, the mass throughput of fluid and/or the velocity of the fluid flowing through the respective oblong opening. In this case, a time overlap may also be realized between the discharge or intake of fluid through respectively adjacent oblong openings 37a, 37b, 37c or 38a, 38b, 38c of a row of oblong openings 37a, 37b, 37c, 38a, 38b, 38c. The time overlap may be realized, in particular, such that a discharge through a respectively adjacent oblong opening can also take place up to one fourth of the discharge time of the respective discharge process through an oblong opening. On a flow body with a chord length between 0.5 m and 3 m, the period for a respectively continuous discharge of fluid may lie, for example, between 0.1 seconds and 3 seconds. According to an embodiment of the invention, it is proposed, in particular, that the discharge periods are identical as a function of the time.

According to an embodiment of the invention, the flow body B that may comprise, in particular, a regulating flap or a high-lift flap HAK features a fluid line or flow channel 50 and an opening 51 at a respective oblong opening in order to influence the flow that occurs against the flow body B and at least partially around this flow body along a flow surface section S, wherein the flow channel 50 leads into the aforementioned oblong opening with an end section 53 of the flow channel 50. The flow channel 50 may be connected to a junction conduit or flow conduit 45. According to the embodiment illustrated in FIG. 5, the junction conduit or flow conduit 45 may be connected to a flow channel 40 that is fluidically connected to an opening 41 for taking in and/or blowing out fluid on a flow surface section S and, in particular, may be situated in front of the opening 51 viewed in the flow body chord direction T-B. A flow booster drive 70 with a first inlet/outlet side 70a and a second inlet/outlet side 70b is integrated into the fluid line 50 in front of the end section 53 in order to control the intake and discharge of fluid through the openings 41 and 51, in particular, in the periodically alternating fashion described above. The flow booster drive 70 may also be arranged in the junction conduit 45 or in the channel 40.

Figure 6:
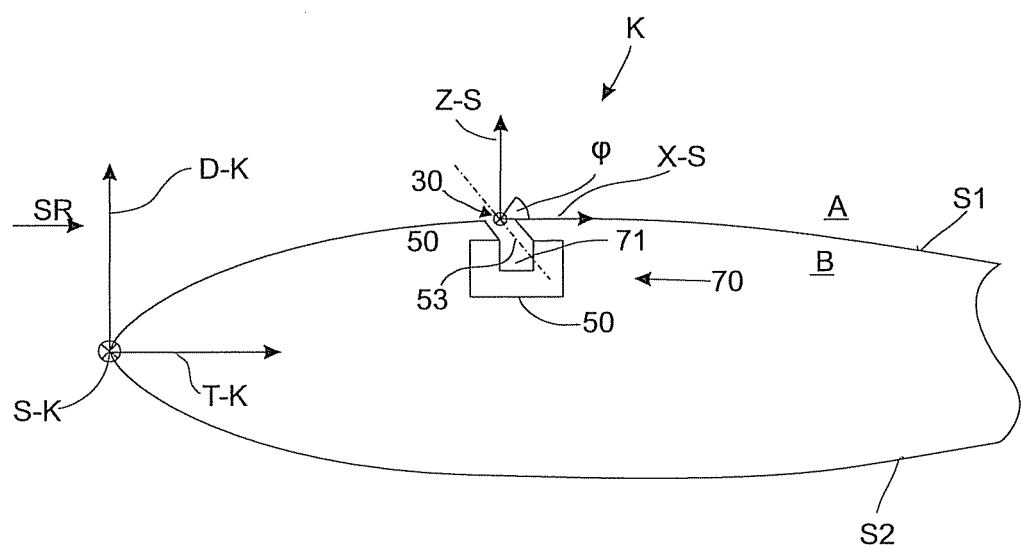
FIG. 6 shows a cross-sectional representation of the flow body according to FIG. 4 in the region of the rearwardly discharging line end section that, in contrast to the line end section illustrated in FIG. 4, extends in a curved fashion.

According to another embodiment that is illustrated in FIG. 6, two openings that are situated adjacent to one another in the flow body wingspan direction S-B (only the opening 51 is illustrated in FIG. 6) are connected to one another via a junction conduit 46, into which a flow drive is integrated, such that the intake and discharge of fluid through these openings can take place, in particular, in the periodically alternating fashion described above. The embodiment according to FIG. 5 may also be combined with the embodiment according to FIG. 6 such that at least one opening that is spaced apart in the flow body chord direction T-B and at least one opening that is spaced apart in the flow body wingspan direction S-B are connected to an opening 51 via respective junction conduits 45 and 46 and, in particular, a periodic and alternating intake and discharge of fluid can be realized.

Figure 7:
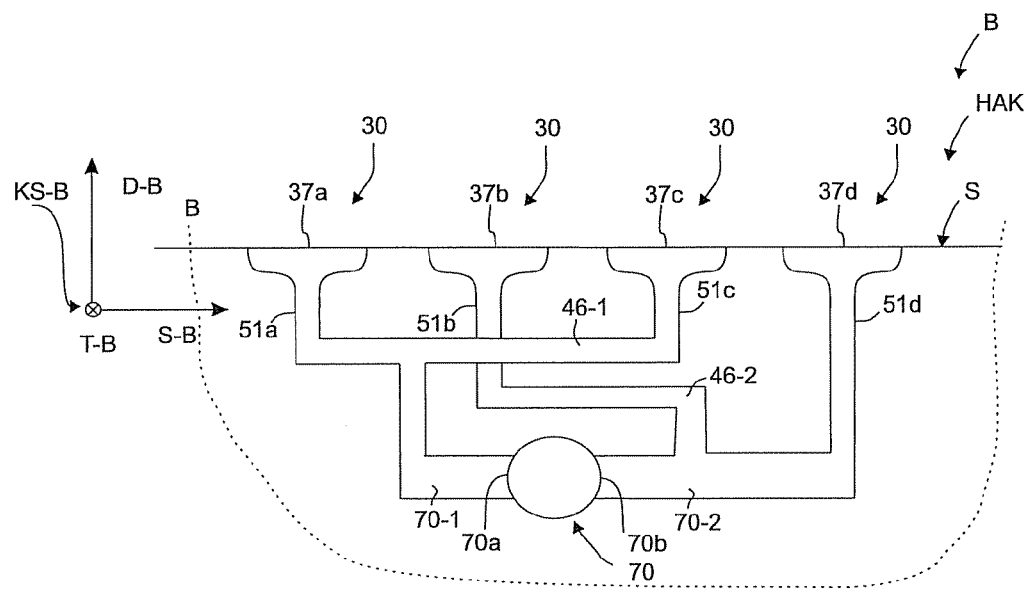
FIG. 7 shows a cross section through an embodiment of a flow body with four fluid lines that are arranged behind one another in the flow body wingspan direction, wherein these four fluid lines lead into the flow surface section and respectively form an oblong opening therein.

The respective intake opening 41 may be situated adjacent to or in front of the opening 51 connected thereto via a flow channel viewed in the flow body chord direction T-K such that a row of inlet openings 41 is arranged in the flow surface section S in front of the row of inlet openings 51 in the form of oblong openings that are situated behind one another in the flow body wingspan direction S-K and/or adjacent to one another (FIG. 7). Alternatively, the inlet openings 51 may also be situated behind a row of inlet openings 51 viewed opposite to the flow body chord direction T-K.

In the embodiment according to FIG. 7, four or generally several openings 37a, 37b, 37c, 37d that are situated adjacent to one another in the flow body wingspan direction S-B and may comprise, in particular, the openings identified by the same reference symbol in FIG. 4 are connected to one another via fluid lines, to which a flow booster drive or a pump is coupled. Two respective openings generally are connected to one another via a junction conduit 46-1, 46-2, several of which are connected to a flow booster drive (FIG. 7) in order to adjust the flow direction and the fluid pressure in the several junction conduits 46-1, 46-2 by means of the flow booster drive 70 and to realize, in particular, a periodic and alternating intake and discharge of fluid through two respectively adjacent openings 37a, 37 or 37c, 37d.

The flow booster drive is provided in order to temporarily drive the fluid situated in the respective conduit in a predetermined direction when the flow booster drive 70 is actuated and to thusly adjust a fluid flow with predetermined direction and intensity in the conduit. For this purpose, the flow booster drive 70 is integrated or installed in a junction conduit or a channel that is connected to such a junction conduit. In this way, the discharge and intake of fluid through respectively adjacent flow channels 50 can also take place in phase opposition and alternately.

In this case, several flow booster drives may also be integrated into one or more conduits of the fluid-dynamic body. The conduit, into which the flow booster drive or the pump is integrated, features an inlet 70a and an outlet 70b. The flow booster drive may operate with a permanently adjusted power or be realized in such a way that it varies or controls the intake pressure and/or the output pressure and/or the differential pressure based on a corresponding activation by a control function.

According to the invention, an arrangement of a regulating flap such as a high-lift flap HAK or a rudder, on which a device for influencing the flow is arranged, consequently is also proposed. The regulating flap is realized with a flow booster drive 70 according to one of the inventive embodiments. The device for influencing the flow features:
  an activation device that is functionally connected to the regulating flap adjusting device and serves for controlling the flow booster drive 70, wherein the activation device receives an input variable in the form of the adjusting position of the regulating flap K from the regulating flap adjusting device, and
  an activation function that is functionally connected to the flow booster drive 70 and serves for generating a command signal for controlling the flow booster drive 70, wherein the activation function generates a corresponding control signal for activating the flow booster drive 70 from the adjusting position of the regulating flap K.

In the embodiment of the inventive flow body B in the form of a regulating flap and, in particular, a high-lift flap HAK with oblong openings that are fluidically connected to one another via a segment junction conduit 55 and serve for blowing out and taking in fluid through two respectively adjacent openings 51, 37a and 37b, 37c and 37d alternately and in phase opposition, the activation device may be realized in such a way that it adjusts the frequency, with which the intake and discharge of a fluid through each opening 51 alternate with one another, in dependence on the adjusting position of the regulating flap and commands the flow booster drive 70 accordingly in order to realize an alternating intake and discharge through each oblong opening. The activation device may feature a function that receives an input signal in the form of the extended position of the regulating flap, generates control commands for the at least one flow booster drive in dependence on the extended position of the regulating flap and transmits these control commands to the flow booster drive, wherein the control commands are realized in such a way that they increase the frequency, with which a discharge and an intake through a respective opening 51 or an oblong opening alternate with one another, as the regulating flap is increasingly extended from its normal position or retracted position.

Figure 8:
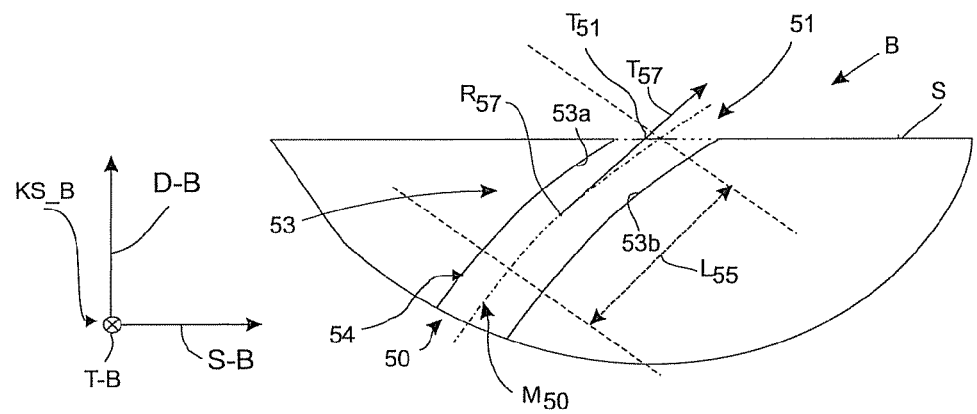
FIG. 8 shows a schematic illustration of a cross section through an inventive flow body according to FIG. 5 or 6, wherein the line end section that leads into the flow surface and forms an opening therein discharges forward referred to the flow body chord direction or in the direction of increasing chord coordinates.

In the embodiment of the inventive flow body B in the form of a regulating flap and, in particular, a high-lift flap HAK, it would furthermore be possible that the end section 53 or at least a wall section 53a and/or 53b thereof can be moved relative to the other sections or components of the flow channel 50 or the and section 53 and, in particular, relative to the flow surface section S between two and positions by means of an actuating drive, namely in such a way that the flow direction of the fluid being discharged from the opening 51 relative to the flow surface section can be varied due to the changing incline of the end section 53 or a wall section 53a and/or 53b relative to the flow surface section S when the actuating drive is accordingly activated. Particularly the discharge angle "phi" of the flow, for which the reference symbol ϕ is used in FIG. 8, is changed in this case. The discharge angle may be defined, in particular, as the angle between the discharge direction of the fluid and the local surface chord direction X-S or the tangent on the flow surface section S in the centroid M of the opening. The activation function may be realized, in particular, in such a way that it receives an input signal in the form of the extended position of the regulating flap, generates control commands for the at least one flow booster drive and transmits these control commands to the flow booster drive, wherein the discharge angle phi of the fluid is adjusted with said control commands as the regulating flap is increasingly extended from its normal position or retracted position, namely in such a way that the discharge direction of the fluid extends in the main wing chord direction T-H of the main wing, on which the regulating flap is arranged. The discharge direction of the fluid preferably may deviate from the main wing chord direction T-H of the main wing in a range between ±20 degrees.

According to FIG. 6, the and section 53 may be adjustable in such a way that the fluid flowing through this end section has a flow component that extends opposite to the flow direction of the fluid flowing around the flow body B in the flow surface section S.

In order to elucidate this approach. FIG. 8 shows the and section 53 with a length L53 and the flow channel 50 with a center line M50 that may be defined, in particular, as the line through the centroids of the smallest cross-sectional areas of the flow channel 50 at the respective location. The tangent T57 on the center line M50 at a reference point R57 thereof within the end section 53 is furthermore illustrated in FIG. 7. The variation or adjustment of the end section 53 or the at least one wall section 53a and/or 53b thereof generally serves for adjusting the direction of the tangent on the center line M50 at a reference point relative to the direction of the tangent TS1 on the centroid of the opening 51 such as, e.g., the tangent T57 on the center line M50 at the reference point R57. According to the invention, the reference point R57 may be spaced apart from the flow surface S by twice the largest possible diameter in this case. According to the invention, it would be possible, in particular, to change the angle of the tangent by at least 10 degrees.

According to the invention, the discharge angle of the fluid being discharged from the respective end section 53 can be adjusted by realizing the orientation of the entire end section 53, i.e., particularly the walls of the end section 53 as a whole or in their unchanged form, such that it can be changed relative to the position of the section 54 of the channel 50 that, viewed from the surface S, lies underneath the and section 53, namely with the aid of a rotary joint such as, e.g., a hinge joint or an elastic structural joint, in which the walls of the channel are realized elastically in a joint region. In order to adjust the orientation of the end section, an actuating drive that serves for adjusting the end section 53 and is functionally connected to the activation device may be coupled to the end section.

Alternatively, the discharge angle phi can be adjusted by realizing the orientation of a wall section 53a that lies at the front of the flow body B viewed in the chord direction T-B and/or a wall section 53b (FIG. 8) of the end section 54 that lies at the rear of the flow body B viewed in the chord direction T-B such that it can be adjusted relative to at least the section 54 and, in particular, also relative to the other wall sections of the end section 43. For this purpose, the end section may be realized with elastic walls and an actuating drive that is functionally connected to the activation device and serves for adjusting the wall section 53a that lies at the front and/or the wall section 53b that lies at the rear of the flow body B viewed in the chord direction T-B may be coupled to the respective wall section 53 or 53b.

The resulting length of the and section 53 in the flow direction may be defined, in particular, in such a way that it amounts to three times the smallest diameter of the opening formed by the end section on the surface S.

Alternatively or additionally to the above-described exemplary embodiments, it would, according to the invention, also be possible to adjust the frequency for alternating the intake and discharge through the oblong openings or openings 51 and/or the pump intake pressure and/or the pump output pressure and/or the differential pump pressure of the respective pump arranged in the main wing 1 and/or in the regulating flap K or the high-lift flap and/or the orientation of the and section 53 or a wall thereof by means of a control device and a device for influencing the flow with an actuating drive that is functionally connected to the control device and adjusted at the end section 53 or the at least one wall section 53a and/or 53b thereof. In this case, the control device is also functionally connected to at least one sensor device FS with a sensor that is arranged on the flow surface section S of the regulating flap K or the high-lift flap and serves for acquiring current flow condition values of the laminar flow on the flow surface section S of the regulating flap K or the high-lift flap, namely in such a way that the control device can receive input signals in the form of sensor signals from the at least one sensor device FS. The sensor device FS may be arranged on the surface S, in particular, in the rear quarter or the rear third of the flow body B viewed in the chord direction T-B (FIGS. 3 and 4).

Alternatively or additionally, flow condition values can be acquired in order to adjust or regulate the intake/discharge frequency and/or the fluid pressure and/or the orientation of the end section 53 or a wall thereof by utilizing other sensors for determining the flow condition on the flow surface section S of the regulating flap K, for example, air data sensors of an aircraft known from the prior art such as, e.g., external barometric pressure sensors arranged in the front fuselage region, wherein the flow condition on the surface S is estimated based on the thusly acquired air data. The control device furthermore features a control function for controlling a predetermined flow condition value on the flow surface section S of the regulating flap K or the high-lift flap. The control function is functionally connected to the respective sensor device in order to receive current flow condition values and optionally connected to the flap adjusting device in order to receive a value for the adjusting position of the regulating flap K or the high-lift flap. The control function is furthermore functionally connected to at least one pump and generates a control signal that the control function transmits to the at least one pump in order to adjust the pump output pressure and/or the pump intake pressure and/or the differential pump pressure and/or the intake/discharge frequency and/or the fluid pressure and/or the orientation of the end section 53 or a wall thereof on the flow surface section S and to thusly influence the flow in the respectively assigned flow channels and therefore on the suction side A of the high-lift flap.

In this exemplary embodiment, the control device may be connected to a flow booster drive that is integrated into one of the conduits provided in the regulating flap.

In the inventive embodiments with a control function, the sensor device may feature a sensor for determining the flow condition of a laminar flow on the flow surface section S of the regulating flap K or of a separated flow. Alternatively or additionally, a sensor for determining the flow velocity may be provided and/or the sensor may comprise of a piezoelectric wall shear stress sensor for determining the wall shear stress.

Figure 9:
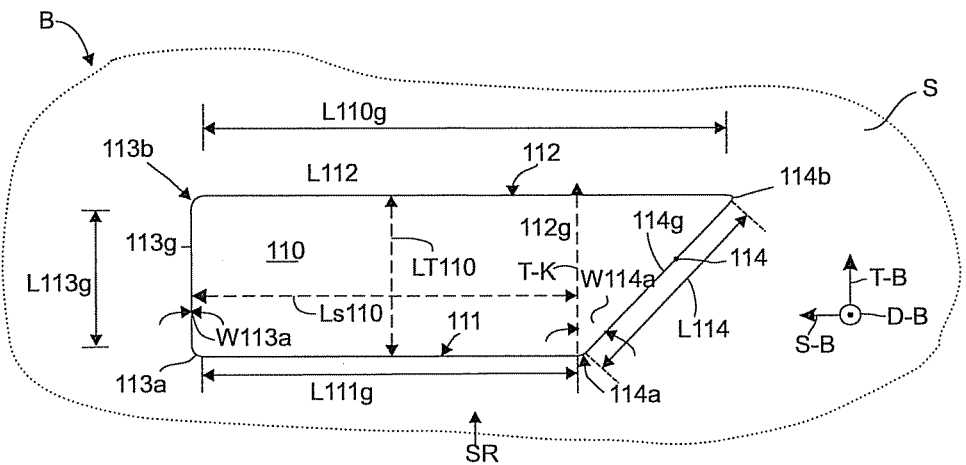
FIG. 9 shows a top view of a flow surface section of a flow body realized in accordance with another inventive aspect, wherein the flow surface section features an opening that is formed in accordance with an inventive embodiment.

According to another aspect of the invention, the flow body B may—in connection with or independently of the above-described embodiments of a flow body K with at least one row of openings that are situated behind one another in the flow body wingspan direction S-K—be designed with at least one segment opening that is arranged on the upper side S1 and/or the underside S2 of the flow body B and realized with longitudinal edges and lateral edges that extend between these longitudinal edges along and/or obliquely to the assumed flow direction, namely in such a way that the length (that is identified, for example, by the reference symbol LS110 in FIG. 9) of the opening (in the example the opening 110 in FIG. 9) in the wingspan direction S-K increases or decreases over a region of at least 50% of the maximum width (that is identified, for example, by the reference symbol LT110 in FIG. 9) in the flow body chord direction T-B of the flow body B and, in particular, the high-lift body HAK.

According to an embodiment of the flow body B, the opening in the surface S is designed, in particular, in the form of an oblong opening, the shape of which may be realized, in particular, such that the longest cross-sectional line between two points of opposite lateral edges is longer in the flow body wingspan direction S-B than in the flow body chord direction T-B, preferably at least twice as long. The openings, the length of which in the wingspan direction S-B increases or decreases in the flow body chord direction T-B, may also be configured in the form of a row of oblong openings 37*a*, 37*b*, 37*c*, 37*d* or 38*a*, 38*b*, 38*c*, 38*d* that are situated behind one another in the flow body wingspan direction S-B and lie in a region between 3% and 12% of the average chord length referred to the flow body chord direction T-B. It would also be possible, in particular, that the at least one opening lies in a region between 3% and 12% of the average chord length referred to the flow body chord direction T-B.

An embodiment of this inventive solution with openings, the respective length of which in the wingspan direction S-B increases or decreases in the flow body chord direction T-B, is described in greater detail with reference to FIG. 9 that shows an embodiment of an oblong opening in the flow surface section S of an inventive flow body B that is identified by the reference symbol 110 together with the coordinate system KS-K of the general flow body B. The opening 110 features longitudinal edges 111 and 112 that extend in the flow body wingspan direction S-B and transverse to the flow direction SR and face one another, as well as lateral edges 113 and 114 that connect the ends of respectively different longitudinal edges 111 and 112 and face one another, wherein a first longitudinal edge 113 essentially extends along the flow body chord direction T-K and a second longitudinal edge 114 sectionally extends relative to the first longitudinal edge 113 at an angle other than 90 degrees in the illustrated embodiment of the opening 110.

The opening 110 shown in FIG. 9 essentially has the shape of a trapezoid although the lateral edges are not acutely connected to one another by means of corners, but the lateral edges rather transform into one another via curved edge sections. The longitudinal edges 111 and 112 are realized in a linear fashion with the respective sections 111*g* and 112*g* and respectively have a length L111*g* and L112*g*. The lateral edges 113 and 114 are connected to the respective ends of the longitudinal edges 111 and 112 with a respective curved section 113*a* and 113*b* or 114*a* and 114*b*, between which respective linear sections 113*g* and 114*g* with a respective length L113*g* and L114*g* are connected to one another. The curved sections are realized in such a way that they form a continuous transition between the direction of the linear sections 111*g* and 112*g* of the respective longitudinal edges 111 and 112 and the respective direction of the linear sections 113*g* and 114*g* of the lateral edges 113 and 114. The essentially trapezoidal shape of the opening 110 illustrated in the embodiment according to FIG. 9 results, in particular, due to the fact that the longitudinal edges 111 or 112 extending in the flow body wingspan direction S-B or their linear sections 111*g* and 112*g* respectively extend parallel to one another or with a relatively slight deviation of their longitudinal directions, in particular, of no more than 20 degrees and the lateral edges 113 and 114 extending in the flow body chord direction T-B or their linear sections 113*g* and 114*g* are respectively realized in the form of trapezoid sides that extend in different directions viewed in the flow body chord direction T-K and referred to the flow body chord direction T-K. In the illustrated embodiment of the opening 110, the longer longitudinal edge 112 is situated behind the shorter longitudinal edge 111 viewed in the flow body chord direction T-K, i.e., at a location with a greater flow body chord direction coordinate. The trapezoidal shape of the opening 110 shown in FIG. 9 clearly results, in particular, from the idealized shape thereof, in which the extensions of the linearly extending sections 113*g* and 111*g*, 113*g* and 112*g*, 114*g* and 111*g*, 11*g* and 112*g* respectively meet in a fictitious trapezoid corner. The longitudinal edges 111, 112 form the base sides of the trapezoid in this case.

Figure 10:
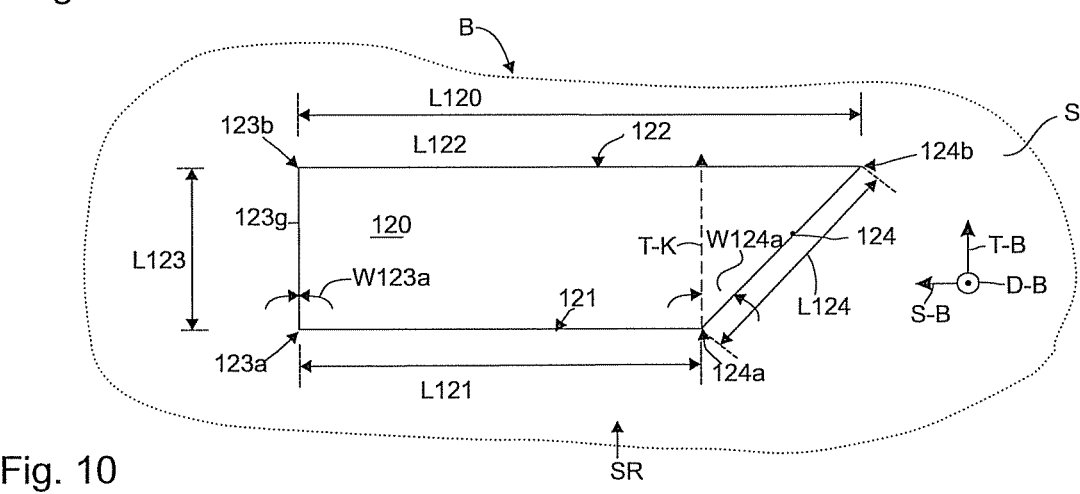
FIG. 10 shows a top view of a flow surface section according to FIG. 9 with an opening that is formed in accordance with another inventive embodiment.

According to another embodiment of the opening that can be used in accordance with the invention, the edge shape thereof may, as illustrated in FIG. 10, be realized with corners 123a, 123b, 124a, 124b and linear longitudinal edges 121 and 122 that form the base sides of a trapezoid and extend in the flow body wingspan direction S-B, as well as linear lateral edges 123 and 124 that extend in the flow body chord direction T-B and in which two respective edge sections 121 and 123, 121 and 124, 122 and 123, 122 and 124 respectively converge and end in a corner 123a or 124a or 123b or 124b. In this case, the longitudinal edges or edge sections 121 and 122 have the edge lengths L121 and L122 and the lateral edges 123 and 124 have the edge lengths L121 and L122.

In the embodiments of the openings that can be used in accordance with the invention and are illustrated in FIGS. 9 and 10, a first lateral edge extends at least sectionally (FIG. 9) or entirely (FIG. 10) along and, in particular, in the flow body chord direction T-K and the other lateral edge extends at least sectionally (FIG. 9) or entirely (FIG. 10) at an angle of at least 20 degrees relative to the flow body chord direction T-K. This angle is identified by the reference symbol W114a in the embodiment according to FIG. 9 and by the reference symbol W124a in the embodiment according to FIG. 10. In the embodiments illustrated in FIGS. 9 and 10, the angle between the linear section 113g, 123g of the respective lateral edge 113 or 123 and the flow body chord direction T-K is respectively identified by the reference symbols W113a and W123a. The angles W113a and W123a respectively are 0 degrees in the embodiments according to FIGS. 9 and 10. According to the invention, the angle W113a or W123a generally may also be an angle other than 0 degrees. In this case, the linear section 113g, 123g of the lateral edge 113 or the lateral edge 123 may be aligned relative to the orientation indicated in FIGS. 9 and 10 in such a way that the angles W113a or W123a form a positive angle or a negative angle. In this way, the length (e.g., L8110) extending in the wingspan direction S-B increases or decreases along the flow body chord direction T-B.

According to an aspect of the invention, at least sections of opposite lateral edges of an opening that extend along the chord direction T-B, e.g. 113g, 114g, are aligned in different directions, wherein the resulting angular difference between sections thereof amounts to at least 10 degrees referred to the chord direction and, in particular, at least 15 degrees in order to also improve the attained fluid-dynamic effect. Consequently, the length (for example, the length LS110 illustrated in FIG. 9) of the oblong opening extending in the wingspan direction S-K increases or decreases in the flow body chord direction T-B at least sectionally and, in particular, over at least a region of 50% of the width extending in the chord direction T-B (for example, the width LT110 illustrated in FIG. 9) viewed in the flow body chord direction T-B of the high-lift body B.

At least one of the two lateral edge sections that, if applicable, are at least sectionally linear (FIGS. 9 to 14) or the curved lateral edges (FIG. 15) extend in such a way that their local direction has a positive orientation angle, preferably between 0 degrees and +45 degrees, or a negative orientation angle, preferably between 0 degrees and −45 degrees, over a region of 50% of the maximum width (e.g., reference symbol LT110) in the flow body chord direction T-B of the flow body B, wherein the local orientation angles of the longitudinal edges preferably differ from one another by at least 10 degrees, particularly by 15 degrees, over a region of 50% of the maximum width. A lateral edge (e.g., 113, 114) has a positive orientation angle if the resulting direction of the lateral edge or a local point thereof extends counterclockwise of the flow body chord direction T-B. The orientation angles of the longitudinal edges also may be sectionally or entirely oriented differently with respect to the flow body wingspan direction S-B and preferably lie between ±20 degrees. In this case, a longitudinal edge (e.g., 111, 112) has a positive orientation angle if the resulting direction of the longitudinal edge or a local point thereof extends counterclockwise of the flow body wingspan direction S-B.

The respective openings 110 and 120 shown in FIGS. 9, 10 and 13 are, according to the coordinate system KS-K of the flow body K illustrated in these figures, arranged on the flow body K in such a way that the shortest longitudinal side 111, 121, 131 of the trapezoid lies in front of the respective longer longitudinal side 112 or 122 132 viewed opposite to the flow direction SR or flow body chord direction T-B, i.e., the shorter longitudinal side 111, 121, 131 lies in front of the longer longitudinal side 112 or 122 or 132 of the trapezoid viewed in the flow body chord direction T-K. This situation is reversed on the opening according to FIGS. 14 and 15: the shorter longitudinal side 141, 151 of the trapezoid lies in front of the longer longitudinal side 142 or 152 of the trapezoid viewed opposite to the flow direction SR or flow body chord direction T-B, i.e., the shorter longitudinal side 141, 151 of the trapezoid lies in front of the longer longitudinal side 142 or 152 of the trapezoid viewed in the flow body chord direction T-K.

The shape of the opening may also be respectively realized symmetrical referred to a center axis MA or the flow body chord direction T-B, i.e., the lateral edges extend symmetrical to the center axis MA or the flow body chord direction T-B.

Figure 11:
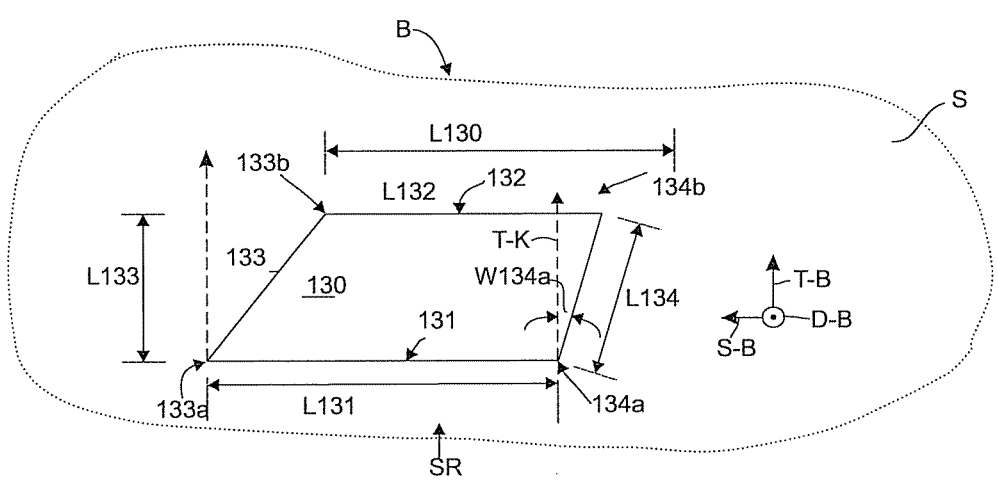
FIG. 11 shows a top view of a flow surface section according to FIG. 9 with an opening that is formed in accordance with another inventive embodiment.
Figure 12:
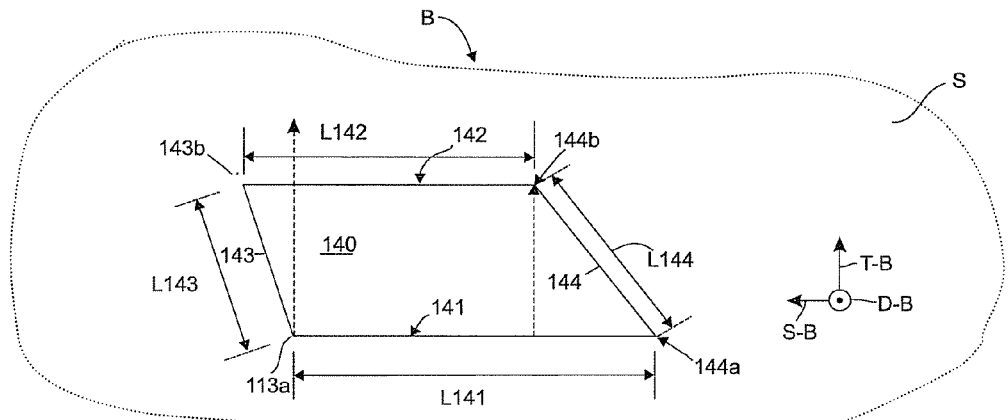
FIG. 12 shows a top view of a flow surface section according to FIG. 9 with an opening that is formed in accordance with another inventive embodiment.

According to other embodiments of the opening that can be used in accordance with the invention and are illustrated in FIGS. 11 and 12, the edge of said opening may be shaped such that both lateral edges 133, 134 and 143, 144 extend in a "positive" or "negative" direction and the opening therefore has an approximately parallelogram-like shape. Corners 123a, 123b, 124a, 124b and 123a, 123b, 124a, 124b consequently are respectively situated between the linear longitudinal edges 131, 132 and 141, 141 with the respective lengths L131, L132 and L141, L141 and the lateral edges 133, 134 and 143, 144 with the respective lengths L133, L134 and L143, L144. In these embodiments, as well as generally according to the invention, at least part of the transitions between a longitudinal edge and a lateral edge may be realized in the form of curved edge sections rather than corners as illustrated in the embodiments according to FIG. 9 or 15.

Other embodiments of the openings that can be used in accordance with the invention are illustrated in FIGS. 13 and 14, in which both lateral edges 153, 154 and 163, 164 extend in a "positive" or "negative" direction such that the opening has an approximately parallelogram-like shape. Corners 153a, 153b, 154a, 154b and 163a, 163b, 164a, 164b consequently are respectively situated between the linear longitudinal edges 151, 152 and 161, 161 with the respective lengths L151, L152 and L161, L161 and the lateral edges 153, 154 and 163, 164 with the respective lengths L153, L154 and L163, L164.

In these embodiments, as well as generally according to the invention, at least part of the transitions between a longitudinal edge and a lateral edge may be realized in the form of curved edge sections rather than corners as illustrated in the embodiments according to FIG. 9 or 15.

In the inventive embodiment according to FIG. 15, the longitudinal edges 171, 172, as well as the lateral edges 173, 1742, have a curved shape, wherein the lateral edge 174 essentially extends in a "negative" direction and the other lateral edge 173 is shaped such that the local length LS117 extending in the wingspan direction S-B increases in the flow body chord direction T-B of the flow body B over at least a region of 50% of the maximum width LT170 max.

Inventive arrangements of openings, in which the length of the respective opening extending in the wingspan direction S-B increases or decreases in the flow body chord direction T-B, are illustrated in an exemplary fashion in FIGS. 16 and 17 and described below. Both figures show a flow body B in the form of a main wing or a high-lift flap HAK with two respective arrangements 235, 236 and 335, 336 of openings, into which a fluid line extending in the flow body B respectively leads with an end section, in particular, according to FIGS. 5, 6, 7. Each arrangement of openings is composed of four openings that are situated behind one another in the flow body wingspan direction S-B. According to an aspect of the invention, in which a flow body features at least one opening, the length of which extending in the flow body wingspan direction S-B increases or decreases in the flow body chord direction T-B, at least one side S1. S2 of the flow body B may generally feature at least one opening or several openings that are arranged behind one another viewed in the flow body chord direction T-B, in which case no additional openings are arranged adjacent thereto viewed in the flow body wingspan direction S-B (FIG. 3), or at least one arrangement of openings, wherein the openings of the now of openings are situated behind one another viewed in the flow body wingspan direction S-B. The openings may have an inventive shape as described above, in particular, with reference to FIGS. 9 to 15.

FIG. 16 shows a flow body B that features on a flow surface section S of its upper side S1 a first arrangement 235 of four openings 237a, 237b, 237c, 237c that are arranged adjacent to one another in the flow body wingspan direction S-B and a second arrangement 336 of four openings 238a, 238b, 238c, 238d that are arranged adjacent to one another in the flow body wingspan direction S-B. According to the figures, the openings of both arrangements 235, 236 are oriented on the flow surface section S of the flow body B in such a way that their shorter longitudinal trapezoid side lies in front of the longer longitudinal trapezoid side viewed in the flow body chord direction T-K as illustrated, in principle, in FIGS. 9, 10, 13 and 15. In this case, the openings of each arrangement 235, 236 of openings are arranged in the flow surface section S in such a way that the lateral edges of two adjacently arranged openings that lie adjacent to one another viewed in the flow body wingspan direction S-B, i.e., the lateral edges of a respective pair of openings 237a, 237b and 237c, 237d or 238a, 238b and 238c, 238d (for example, the lateral edges of two such openings 237a, 237b that are situated adjacent to one another in the flow body chord direction T-B are identified by the reference symbols 237a-2 and 237b-1) converge such that the distance between the respectively adjacent openings decreases as the coordinate in the flow body chord direction T-B increases.

According to the invention, it is generally proposed that this distance formed between adjacent lateral edges of two respective adjacent openings in the flow body wingspan direction S-B decreases (FIG. 16) or increases (FIG. 17) along the flow body chord direction S-B at least over an opening region of 30% referred to the flow body chord direction T-B, preferably at least 50% of the maximum width (see reference symbol "LT110" in FIG. 9) of the respective openings, as the coordinate in the flow body chord direction T-B of the flow body B increases. In this case, the openings according to the invention may be realized as described above with reference to FIGS. 9 to 15.

Figure 17:
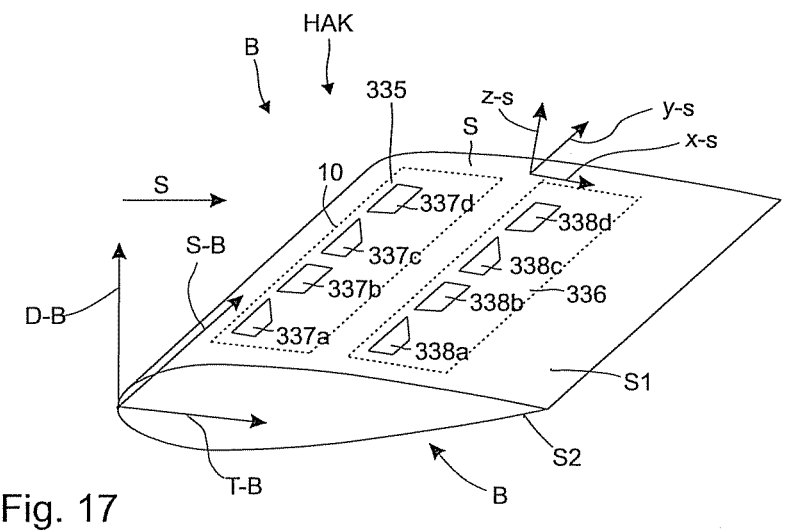
FIG. 17 shows a perspective representation of a flow body that according to another aspect of the invention, is realized with two rows of oblong openings that are respectively arranged behind one another in the flow body wingspan direction, wherein the oblong openings are formed in accordance with FIG. 9, but have a different orientation than illustrated in FIG. 16.
Figure 18:
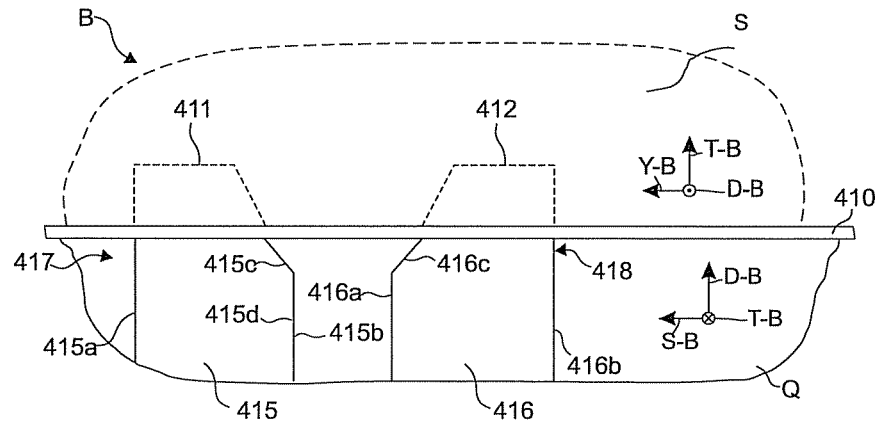
FIG. 18 shows a schematic representation of a flow body realized in accordance with another aspect of the invention, wherein this figure shows a combination of a cross-sectional area with two line end sections of another embodiment of an inventive flow body in the lower part of the illustration and a region of a flow surface section of the flow body with two oblong openings that are respectively realized in the flow surface section in the form of an opening of one of the line end sections in the upper part of the illustration, wherein the cross sections of the line end sections and the corresponding oblong openings are realized in accordance with a first inventive embodiment.
Figure 19:
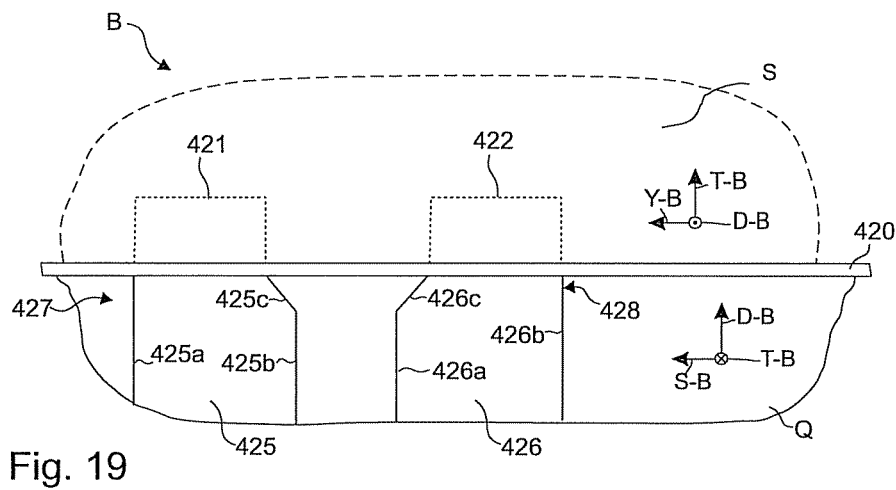
FIG. 19 shows another schematic representation according to FIG. 18, wherein the cross sections of the line end sections and the corresponding oblong openings are realized in accordance with another inventive embodiment.
Figure 20:
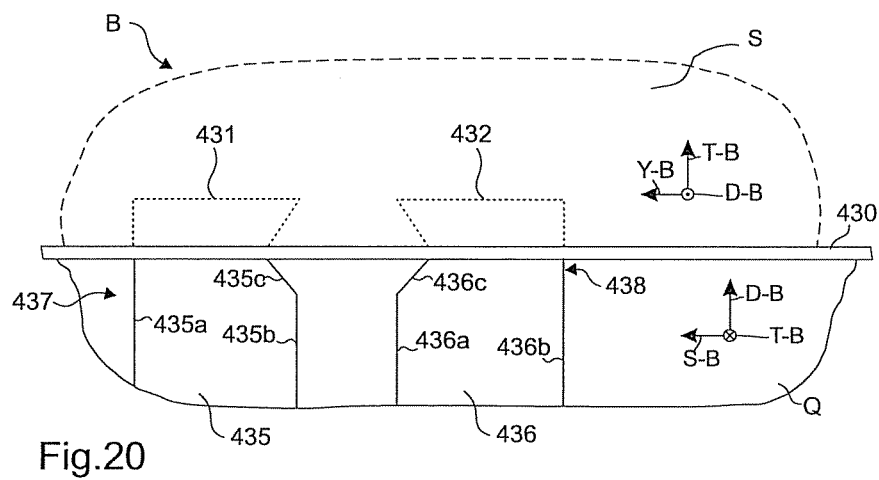
FIG. 20 shows another schematic representation according to FIG. 18, wherein the cross sections of the line end sections and the corresponding oblong openings are realized in accordance with another inventive embodiment.
Figure 21:
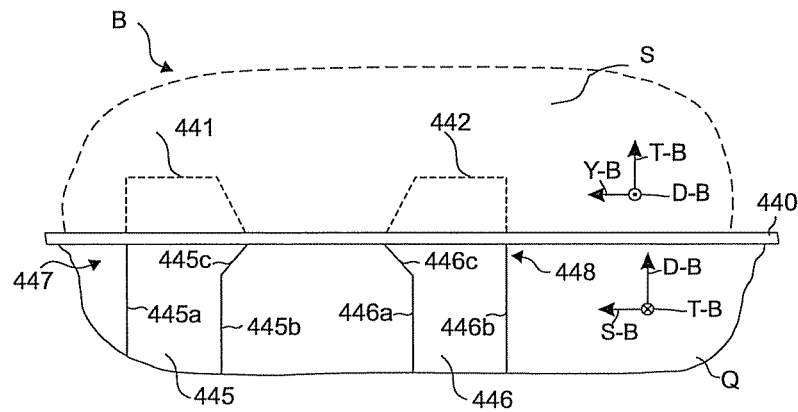
FIG. 21 shows another schematic representation according to FIG. 18, wherein the cross sections of the line end sections and the corresponding oblong openings are realized in accordance with another inventive embodiment.
Figure 22:
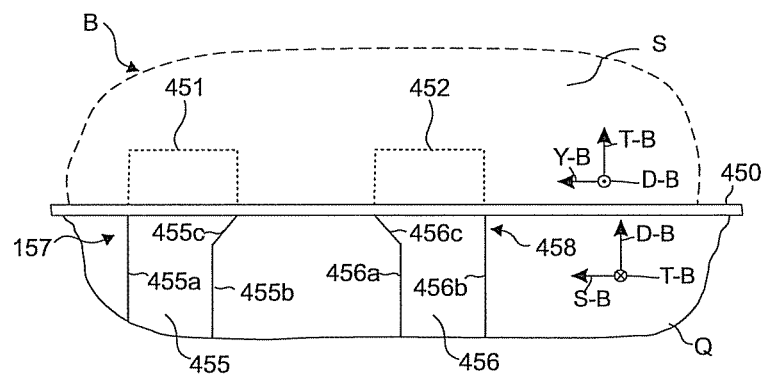
FIG. 22 shows another schematic representation according to FIG. 18, wherein the cross sections of the line end sections and the corresponding oblong openings are realized in accordance with another inventive embodiment.
Figure 23:
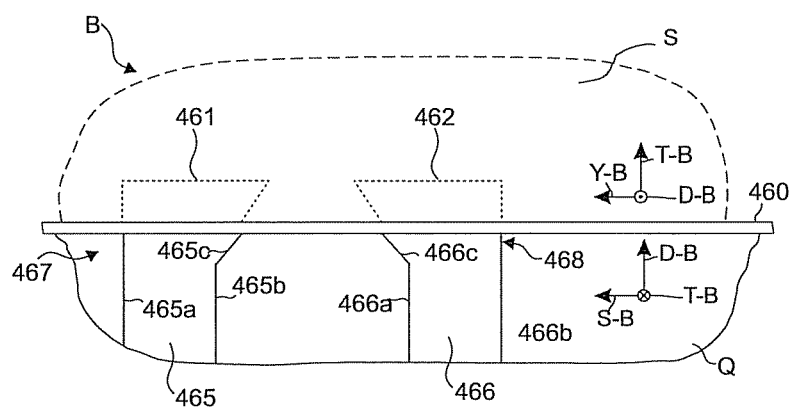
FIG. 23 shows another schematic representation according to FIG. 18, wherein the cross sections of the line end sections and the corresponding oblong openings are realized in accordance with another inventive embodiment.

FIG. 17 also shows a flow body B that features on a flow surface section S of its upper side S1 a first arrangement 335 of four openings 337a, 337b, 337c, 337d that are arranged adjacent to one another viewed in the flow body wingspan direction S-B and a first arrangement 336 of four openings 338a, 338b, 338c, 338d that are arranged adjacent to one another viewed in the flow body wingspan direction S-B. The openings of both arrangements 335, 336 are oriented on the flow surface section S of the flow body B in such a way that their shorter longitudinal trapezoid side lies in front of the longer longitudinal trapezoid side viewed in the flow body chord direction T-K as illustrated, in principle, in FIG. 14. Furthermore, the openings of each arrangement 335, 336 are respectively arranged on the flow surface section S and shaped in such a way that this distance formed between adjacent lateral edges of two respective adjacent openings in the flow body wingspan direction S-B increases (FIG. 17) along the flow body chord direction S-B at least over an opening region of 30% referred to the flow body chord direction T-B, preferably at least 50% of the maximum width (see reference symbol "LT110" in FIG. 9) of the respective openings, as the coordinate in the flow body chord direction T-B of the flow body B increases.

In these embodiments, each arrangement features an even number of openings such as, e.g., two, four or six openings.

In these embodiments of the invention, it would be possible, in particular, to realize an alternate intake and discharge in one respective time segment through two oblong openings 237a and 237b, 237c and 237d, 238a and 238b, 238c and 238d, 337a and 337b, 337c and 337d, 338a and 338b, 338c and 338d of the row of openings by means of at least one flow booster drive 70 and fluid lines that are connected to the respective openings and coupled to the flow booster drive 70, e.g., according to FIG. 7, wherein an intake through a respective first oblong opening (e.g., intermittently through the openings 237a and 237c, 238a and 238c, 337a and 337c, 338a and 338c) and a discharge through a second oblong opening (e.g., in the same time segment through the openings 237b and 237d, 238b and 238d, 337b and 337d, 338b and 338) of the respectively adjacent oblong openings and vise versa simultaneously take place in each time segment.

On an inventive flow body B with at least one row of openings that are situated behind one another viewed in the flow body wingspan direction S-B, a periodic and alternate discharge and intake of fluid through two respectively adjacent openings 237a and 237b, 237c and 237d, 238a and 238b, 238c and 238d, 337a and 337b, 337c and 337d, 338a and 338b, 338c and 338d of the respective arrangement 235, 236, 335, 336 of openings causes the fluid flowing along the respective flow surface section S due to the intended flow against the flow body in the flow direction SR to mix with the fluid being discharged through the respective openings. The alternate intake and discharge of fluid through two adjacent openings also forms a vortex that extends along the chord direction T-B behind two respectively adjacent openings due to the interaction between the fluid flowing along the flow surface section S and the fluid being discharged from the respective openings, wherein laminar, stable and more energetic flow conditions that avoid or prevent or reduce a separation of the flow from the upper surface of the flow body are realized along the flow surface section S with the aid of said vortex. Due to the above-described inventive shapes and/or size ranges of the segments in the flow body wingspan direction S-K, a pulsed discharge or a discharge of fluid, in particular, with constant (i.e. non-pulsed) throughput over an operating period particularly causes the fluid to be discharged through the openings and to flow along the flow surface section S of the flow body B in a laminar fashion. This stabilizes the laminar flow on the flow surface section S such that the tendency of the flow to separate from the flow surface S is reduced, particularly at certain inflow directions SR, in which the fluid flows against the flow body B. This effect is improved with the inventive solutions such as, in particular, the alternate and periodic intake and discharge of fluid by means of or through respectively adjacent openings realized in accordance with the invention (see FIGS. 16 and 17) such that the tendency of the flow to separate is reduced and compensated or even eliminated with the inventive solution.

On flow bodies B, lateral vortexes that propagate along the wingspan direction S-B may be formed on the surface S1 of the flow body depending on its shape during an intended inflow and, in particular, if the inflow occurs transverse to the chord direction T-B. This can occur, in particular, with backswept wings on the main wings and/or on the regulating flaps or high-lift flaps arranged thereon. The direction of the lateral vortexes is indicated in an exemplary fashion with the arrow WQ in FIG. 16. This effect is reduced and compensated or even eliminated with the inventive solutions such as, in particular, the alternate and periodic intake and discharge of fluid by means of respectively adjacent openings realized in accordance with the invention.

These effects can be realized alternatively or additionally to the inventive solutions with the embodiments of the invention that are described below with reference to FIGS. 18 to 23 that respectively show a flow surface section S of a flow body B such as, in particular, a main wing or a regulating flap or high-lift flap of an aircraft.

The illustrations in FIGS. 18 to 23 respectively show a combination of a cross-sectional area Q with an outer shell 410 or 420 or 430 or 440 or 450 or 460 of the flow body B and two fluid lines 415 and 416 or 425 and 426 or 435 and 436 or 445 and 446 or 455 and 456 or 465 and 466 with a respective end section 417 and 418 or 427 and 428 or 437 and 438 or 447 and 448 or 457 and 458 or 467 and 468 in the lower portion of the illustration and a region of a flow surface section S of the flow body B with two openings 411 and 412 or 421 and 422 or 431 and 432 or 441 and 442 or 451 and 452 or 461 and 462 in the flow surface section S, into which one of the fluid lines respectively leads with an end section 411 and 412 or 421 and 422 or 431 and 432 or 441 and 442 or 451 and 452 or 461 and 462 thereof, in the upper portion of the illustration. In FIGS. 18 to 23, the fluid lines are illustrated with side wall sections that are realized on their respective end sections and lie opposite of one another referred to the flow body wingspan direction S-B such that the following side wall sections result for the respective fluid lines in this respect:

the side wall sections 415*a*, 415*b* for the fluid line 415,
the side wall sections 416*a*, 416*b* for the fluid line 416,
the side wall sections 425*a*, 425*b* for the fluid line 425,
the side wall sections 426*a*, 426*b* for the fluid line 426,
the side wall sections 435*a*, 435*b* for the fluid line 435,
the side wall sections 436*a*, 436*b* for the fluid line 436,
the side wall sections 445*a*, 445*b* for the fluid line 445,
the side wall sections 446*a*, 446*b* for the fluid line 446,
the side wall sections 455*a*, 455*b* for the fluid line 455,
the side wall sections 456*a*, 456*b* for the fluid line 456,
the side wall sections 465*a*, 465*b* for the fluid line 465,
the side wall sections 466*a*, 466*b* for the fluid line 466.

The cross-sectional shapes of the fluid lines may be realized differently such as, e.g., in a round fashion. The side wall sections that lie opposite of one another referred to the flow body wingspan direction S-B do not have to be separated by edge lines on the inner side of the fluid lines, but may also comprise surface sections within the edge-free inner surface of the respective fluid line that continuously extends in the circumferential direction. According to the invention, a section (e.g., the section identified by the reference symbol "415*c*" in FIG. 18) of at least one side wall section (in the example the section identified by the reference symbol "415*b*" in FIG. 18) extends angularly to the section (in the example the section identified by the reference symbol "415*d*" in FIG. 18) of the side wall section that lies underneath referred to the thickness direction D-B in the plane defined by the thickness direction D-S and the wingspan direction S-B. According to an embodiment of the invention, this section extends angularly relative to a "lower" section and circumferentially over at least 15% of the overall inner circumference at this location. Specifically provided are:

the adjacently arranged angular sections 415*c* and 416*c* on the fluid lines 415 and 416,
the adjacently arranged angular sections 425*c* and 426*c* on the fluid lines 425 and 426,
the adjacently arranged angular sections 435*c* and 436*c* on the fluid lines 435 and 436,
the adjacently arranged angular sections 445*c* and 446*c* on the fluid lines 445 and 446,
the adjacently arranged angular sections 455*c* and 456*c* on the fluid lines 455 and 456,
the adjacently arranged angular sections 465*c* and 466*c* on the fluid lines 465 and 466.

According to this aspect of the invention, a flow body B is provided with at least one fluid line that leads into a flow surface section with an end section such that a respective opening is formed, wherein said fluid line is shaped in the plane defined by the flow body chord direction T-B and the flow body wingspan direction S-K in such a way that the cross section of the fluid line end section leading into the respective opening decreases or increases in the flow body thickness direction S-D. According to an embodiment of the invention, the reduction or enlargement of the fluid line end section occurs over a section that extends in the flow body thickness direction S-D and is at least as large as 40% of the greatest cross-sectional thickness (that is indicated in an exemplary fashion with the reference symbol "LT170max" in FIG. 15) of the opening, into which the respective end section leads, referred to the flow body chord direction T-B.

The enlargement or reduction of the respective fluid line end section in the plane defined by the flow body chord direction T-B and the flow body wingspan direction S-K may, according to the invention, be realized in combination with different inventive shapes of the respective opening that were described above with reference to FIGS. 9 to 13 as schematically illustrated in the respective surface section S in FIGS. 18 to 23. In this case, more than two fluid lines with openings may also be arranged adjacent to one another in the wingspan direction S-B.

According to an embodiment of the invention, a flow body B, in particular, for being arranged on a trailing edge of a main wing of an aircraft in the form of a high-lift flap HAK is proposed, wherein said flow body features a flow surface section S, S1, S2 that extends along a flow body wingspan direction S-K and a flow body chord direction T-B of the flow body B and at least one fluid line that leads into the flow surface section such that a respective opening is formed and has such a shape that the cross section of the fluid line end section leading into the respective opening is tapered or widened in the flow body thickness direction. This aspect makes it possible to combine all embodiments of the invention that were described above with reference to FIGS. 1 to 23. The at least one opening may, in particular, be shaped in such a way that the local length (see reference symbol "LS110" in FIG. 9) of the opening that extends in the wingspan direction S-K increases or decreases in the flow body chord direction T-B of the flow body B over a region of at least 40% of the maximum width (see reference symbol LT110). On the openings in FIGS. 20 and 23, the local length of the opening extending in the wingspan direction S-K increases while the local length of the opening extending in the wingspan direction S-K decreases on the openings in FIGS. 18 and 21.

The enlargement or reduction of the respective fluid line end section in the plane defined by the flow body chord direction T-B and the flow body wingspan direction S-K may be realized, in particular, on arrangements of openings on the flow body B that are situated behind one another viewed in the wingspan direction S-B. In this case, arrangements of openings that were described above with reference to FIGS. 16 and 17 are preferably provided. FIGS. 18 to 23 respectively show two openings of a row that preferably comprises more than two openings that are situated behind one another viewed in the flow body wingspan direction S-B. In this case, it is proposed, in particular, to respectively provide the angular sections 415*c*, 416*c*, etc. on the two adjacent lateral sections of fluid line end sections of adjacent fluid lines (FIGS. 18 to 23). The fluid flowing along the respective flow surface section S due to the intended flow against the flow body in the flow direction SR is mixed with the fluid being discharged through the respective openings in a particularly advantageous fashion in combination with at least one row of openings that are situated behind one another viewed in the flow body wingspan direction S-B, wherein the cross sections of the fluid line end sections that are respectively arranged on these openings increase or decrease in accordance with FIGS. 18, 21, as well as 20 and 23, in the plane defined by the flow body chord direction T-B and the flow body wingspan direction S-K during an above-described periodic and alternate discharge and intake of fluid through two respective adjacently arranged openings 411 and 412 or 421 and 422 or 431 and 432 or 441 and 442 or 451 and 452 or 461 and 462 of the respective arrangement of openings. The alternate intake and discharge of fluid through two adjacent openings causes the formation of a vortex that extends along the chord direction T-B behind two respectively adjacent openings due to the interaction between the fluid flowing along the flow surface section S and the fluid being discharged from the respective openings, wherein laminar, stable and more energetic flow conditions that avoid or prevent or reduce a separation of the flow from the surface of the flow body are realized along the flow surface section S with the aid of said vortex. Due to the above-described inventive shapes and/or size ranges of the segments in the flow body wingspan direction S-K, a pulsed discharge or a discharge of fluid, in particular, with constant (i.e. non-pulsed) throughput over an operating period particularly causes the fluid to be discharged through the openings and to flow along the flow surface section S of the flow body B in a laminar fashion. This stabilizes the laminar flow on the flow surface section S such that the tendency of the flow to separate from the flow surface S is reduced, particularly at certain inflow directions SR, in which the fluid flows against the flow body B. This effect is improved with the inventive solutions such as, in particular, the alternate and periodic intake and discharge of fluid by means of or through respectively adjacent openings realized in accordance with the invention (see FIGS. 16 and 17) such that the tendency of the flow to separate is reduced and compensated or even eliminated with the inventive solution.

The invention claimed is:

1. A method for taking in and blowing out fluid through a plurality of fluid lines that lead into a flow surface section of a flow body and respectively form an opening therein, wherein the flow body extends in a flow body span direction, a flow body chord direction, and a flow body thickness direction, wherein, relative to the flow body thickness direction, the flow body chord direction is substantially parallel to a direction of a flow of ambient air along the flow surface and the flow body span direction is substantially orthogonal to the direction of the flow of ambient air along the flow surface, wherein a plurality of openings forms at least one row of first openings and second openings that are arranged in a successive manner viewed in the flow body span direction, and wherein the first and the second openings are alternately arranged in a successive manner in the flow body span direction, the method comprising:
   taking in fluid through the first openings during a first time segment and simultaneously blowing out fluid through the second openings during at least a fraction of the first time segment; and
   blowing out fluid through the first openings during a second time segment and simultaneously taking in the fluid through the second openings during at least a fraction of the second time segment.

2. The method according to claim 1, wherein the first time segment and the second time segment are identical and recur alternately.

3. The method according to claim 1, wherein an end section of at least one fluid line of the plurality of fluid lines is shaped in a plane defined by the flow body chord direction and the flow body span direction such that the end section of the at least one fluid line is tapered or widened in a flow body thickness direction.

* * * * *